Sept. 1, 1953 J. H. WILSON 2,650,417
TURRET LATHE
Filed June 5, 1947 23 Sheets-Sheet 1

Inventor
John Hart Wilson
BY Wayland D. Keith
HIS AGENT.

Sept. 1, 1953 J. H. WILSON 2,650,417
TURRET LATHE
Filed June 5, 1947 23 Sheets-Sheet 3

Inventor
John Hart Wilson
BY
Wayland D. Keith
HIS AGENT.

Sept. 1, 1953

J. H. WILSON
TURRET LATHE 2,650,417

Filed June 5, 1947

Inventor
John Hart Wilson
BY
Wayland D. Keith
HIS AGENT.

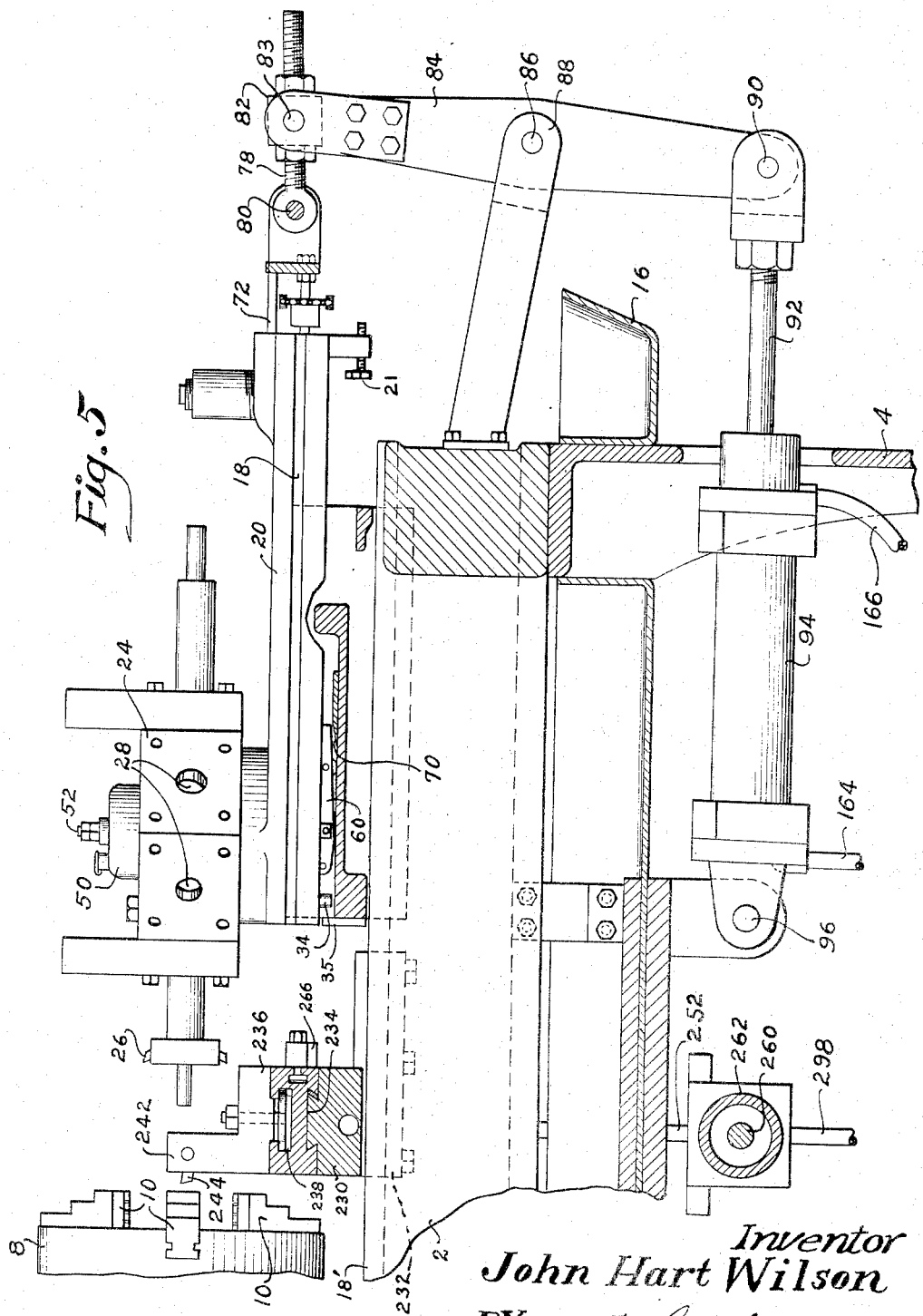

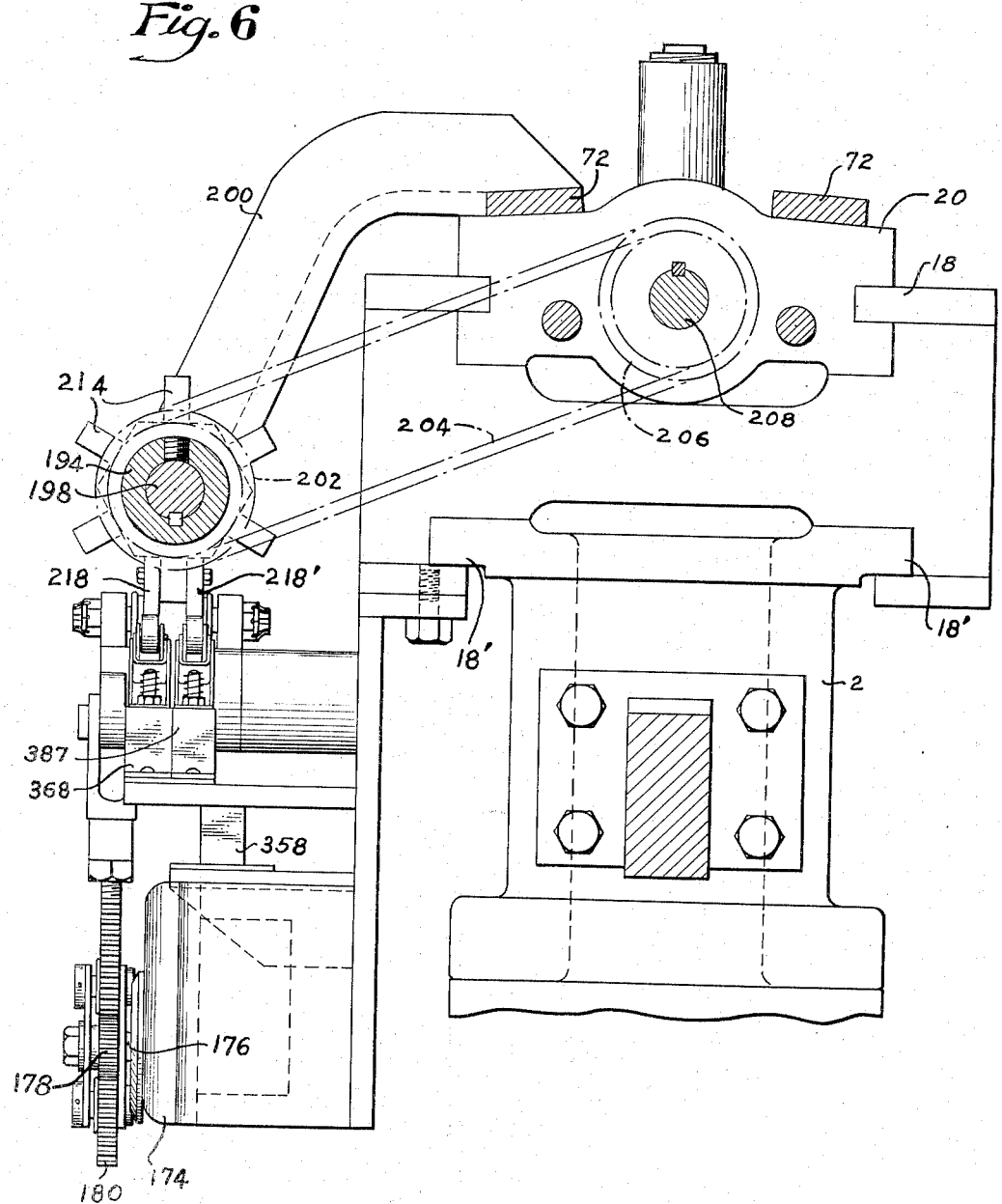

Sept. 1, 1953         J. H. WILSON                2,650,417
                      TURRET LATHE
Filed June 5, 1947                          23 Sheets-Sheet 7
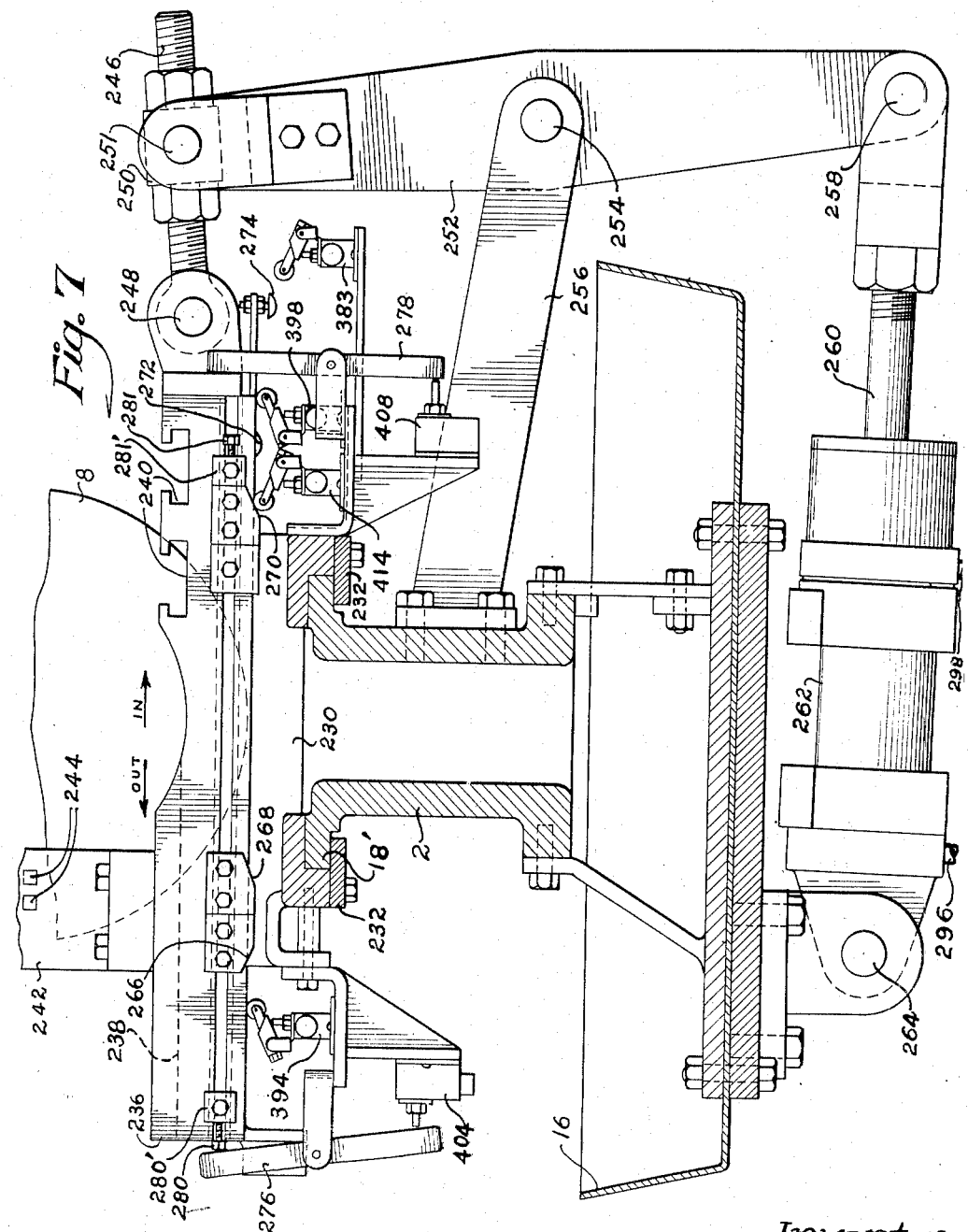
Inventor
John Hart Wilson
BY Wayland D. Keith
          HIS AGENT.

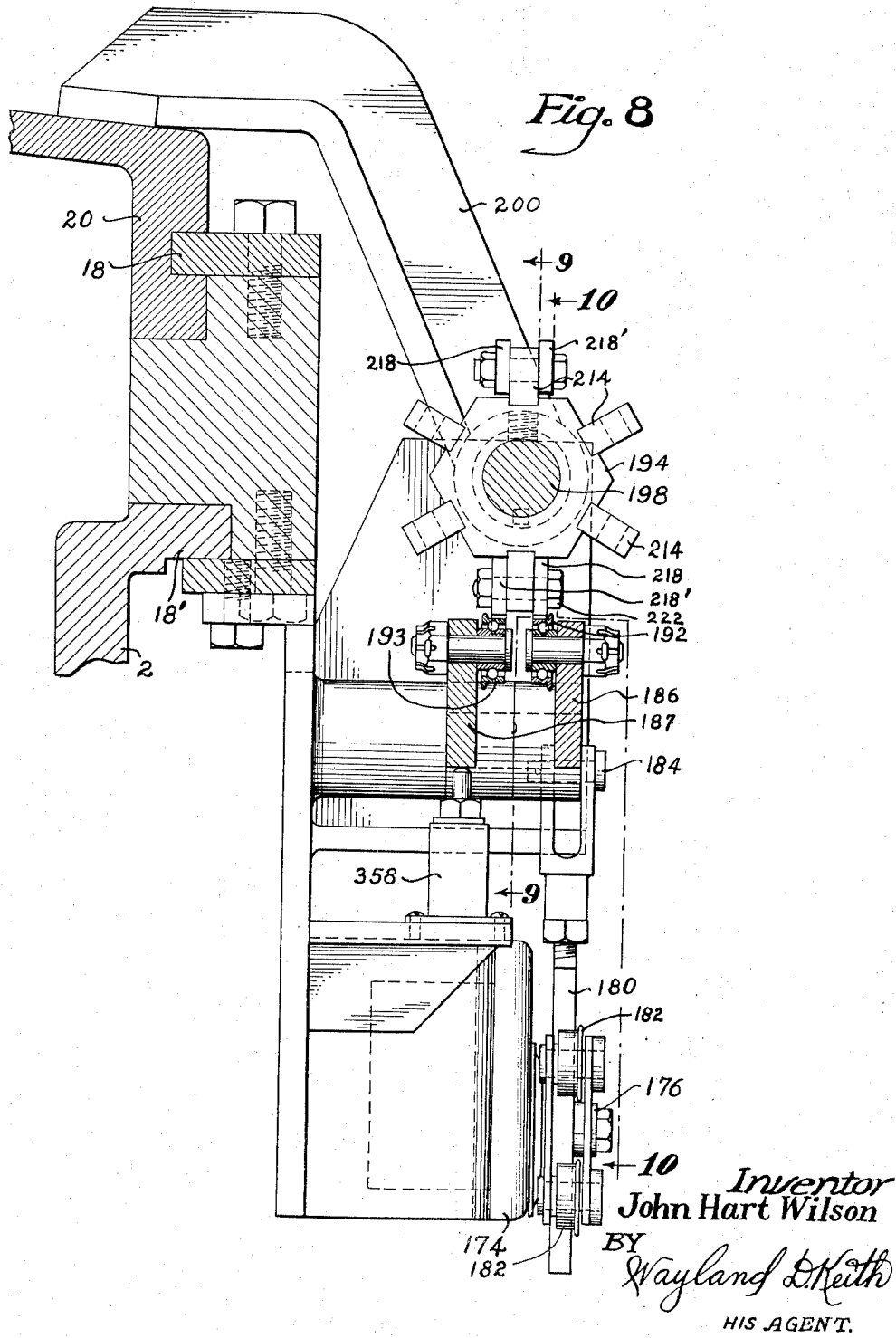

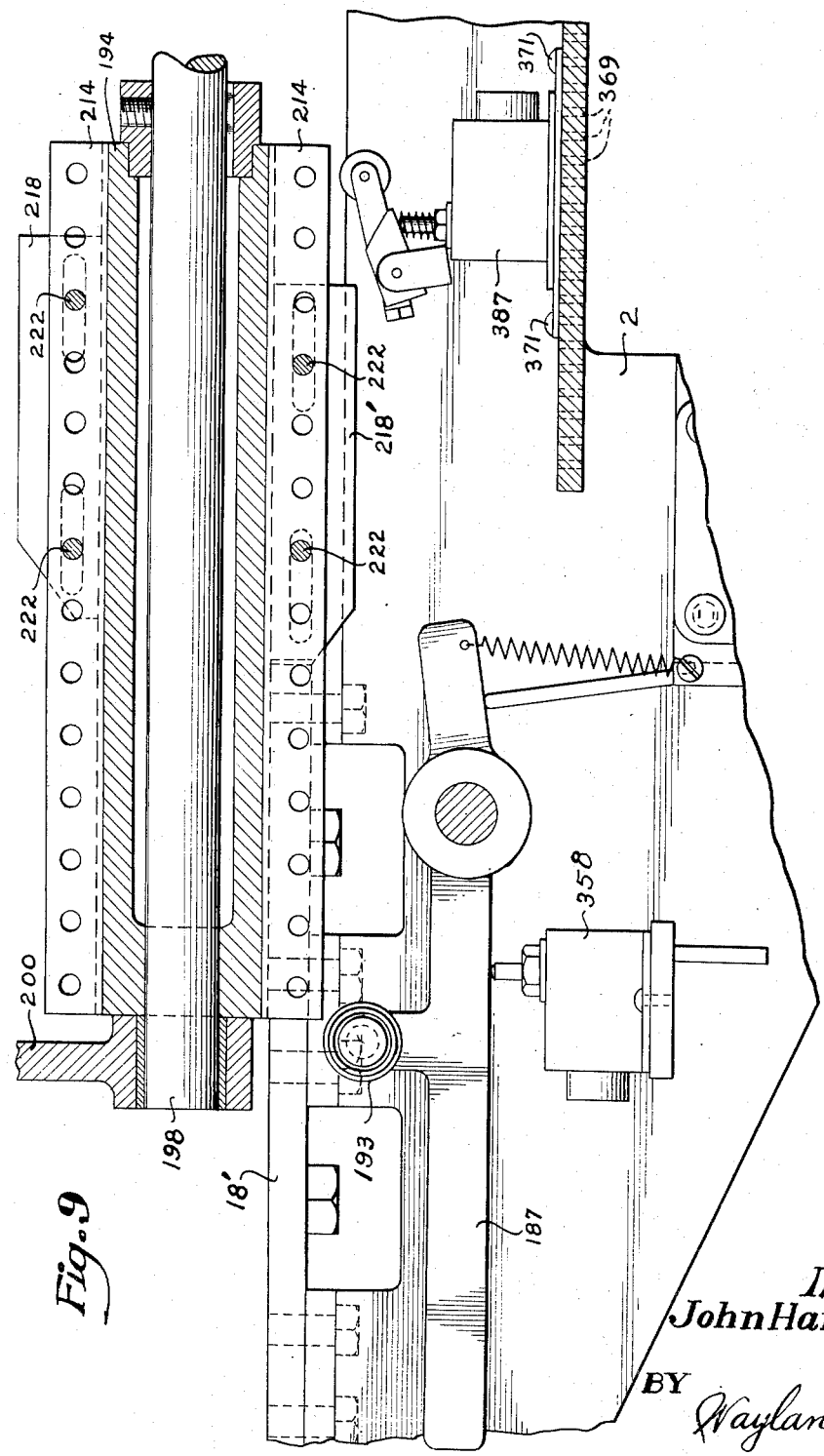

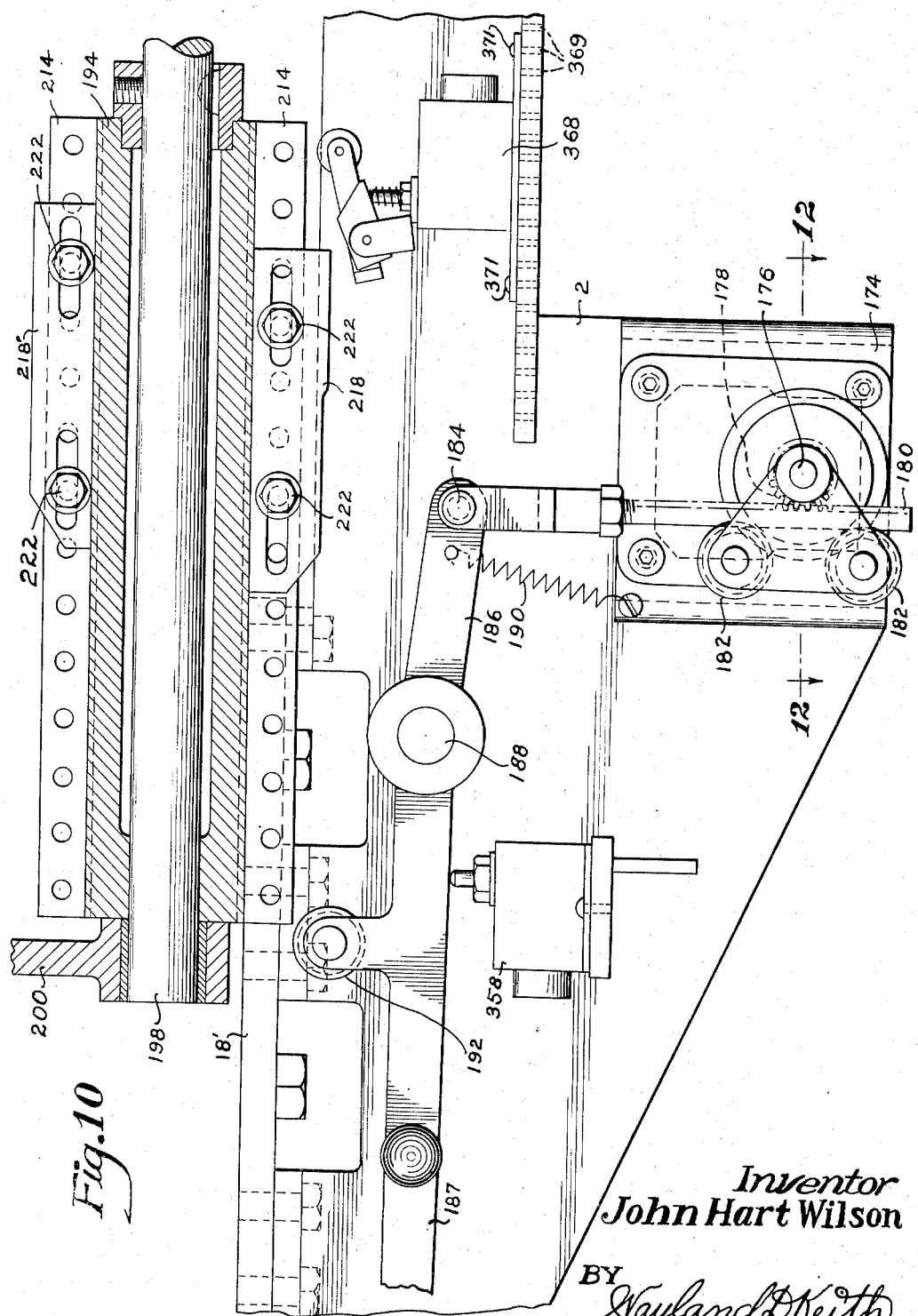

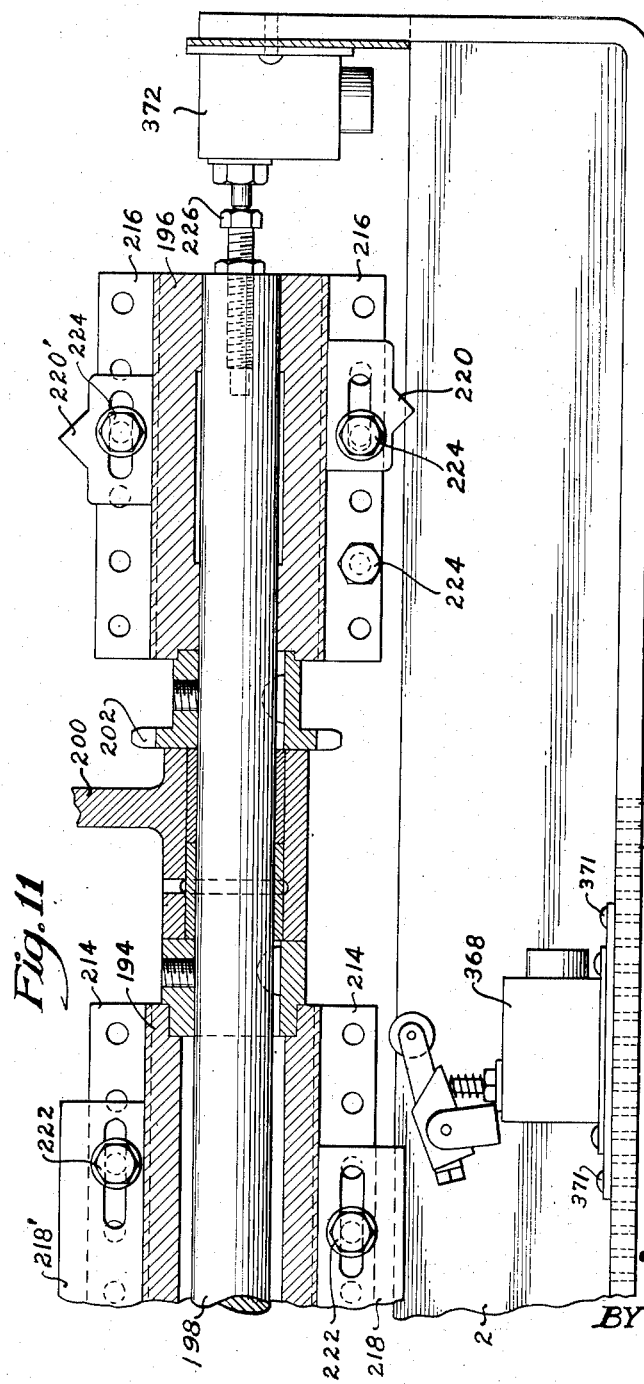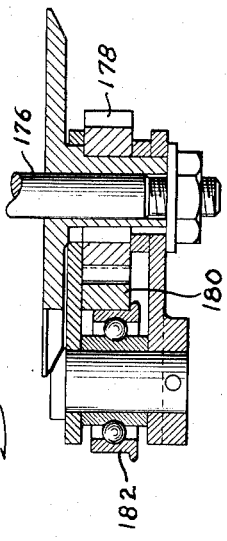

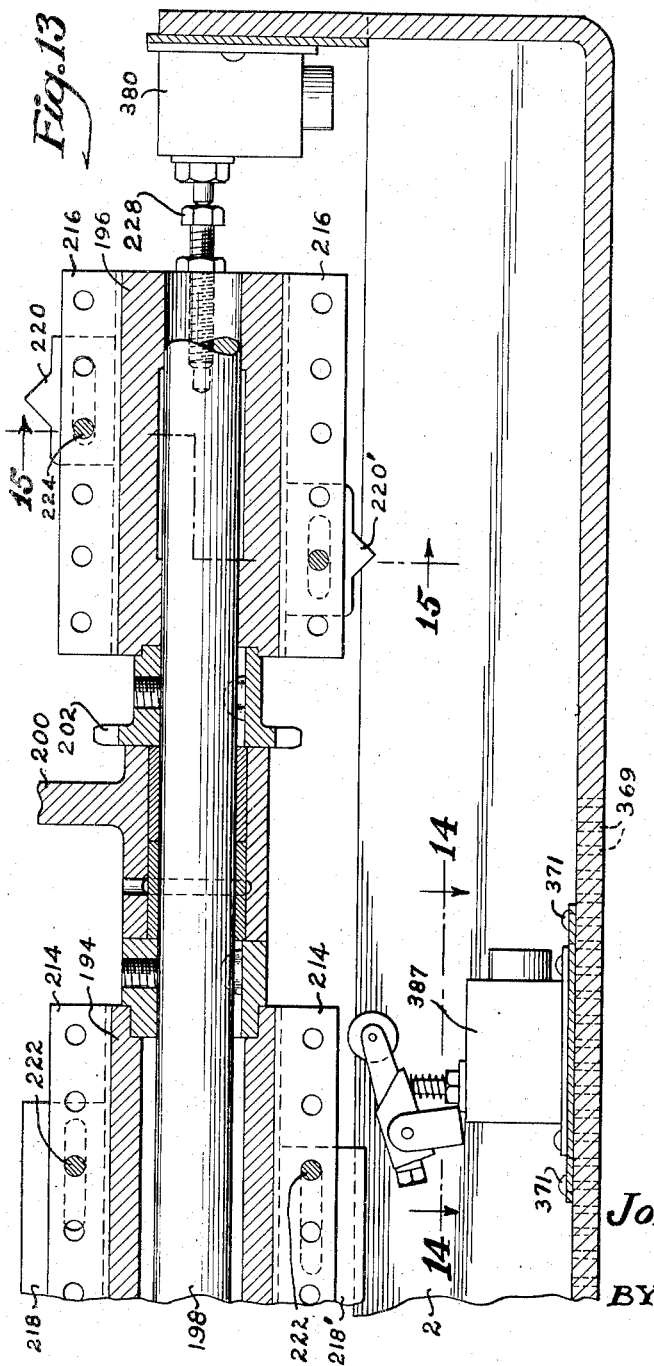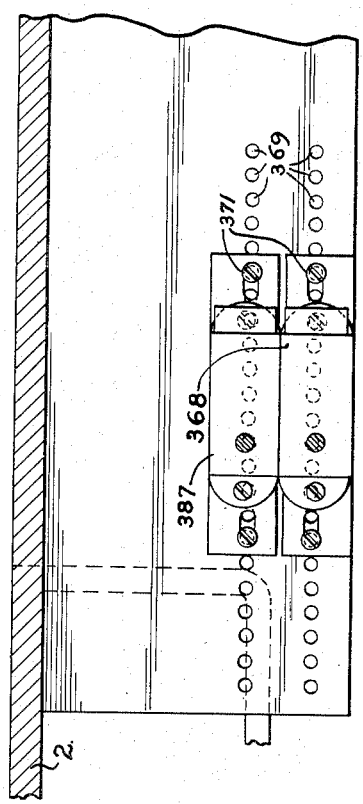

Sept. 1, 1953  J. H. WILSON  2,650,417
TURRET LATHE

Filed June 5, 1947  23 Sheets-Sheet 13

Inventor
John Hart Wilson
BY Wayland D. Keith
HIS AGENT.

Sept. 1, 1953
J. H. WILSON
2,650,417
TURRET LATHE
Filed June 5, 1947
23 Sheets-Sheet 14
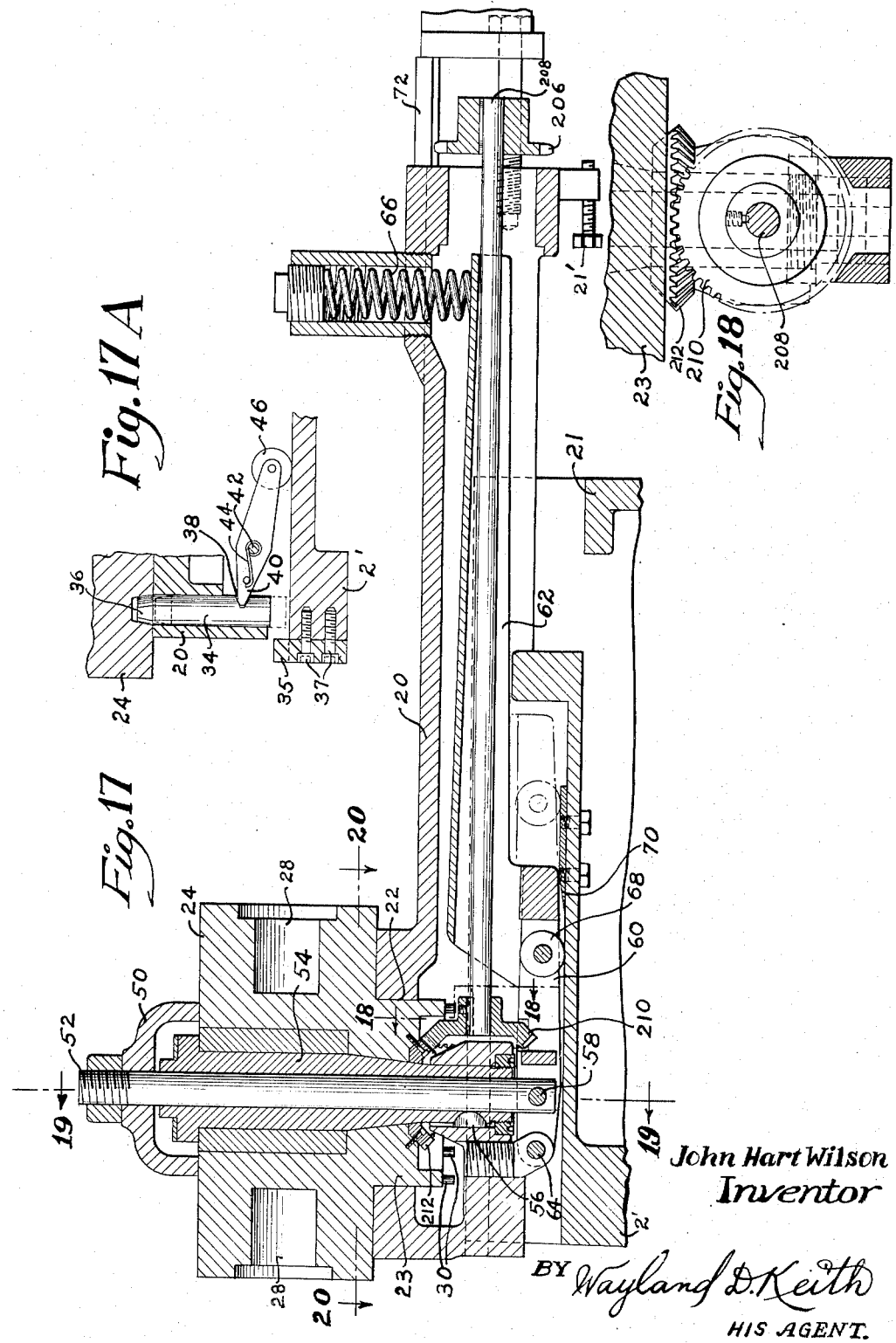
John Hart Wilson
Inventor
BY Wayland D. Keith
HIS AGENT.

Sept. 1, 1953         J. H. WILSON         2,650,417
                      TURRET LATHE
Filed June 5, 1947                    23 Sheets-Sheet 15

Inventor
John Hart Wilson
BY Wayland D. Keith
HIS AGENT.

Sept. 1, 1953 J. H. WILSON 2,650,417
TURRET LATHE

Filed June 5, 1947 23 Sheets-Sheet 18

Inventor
John Hart Wilson
BY Wayland D. Keith
HIS AGENT

Sept. 1, 1953 J. H. WILSON 2,650,417
TURRET LATHE
Filed June 5, 1947 23 Sheets-Sheet 19
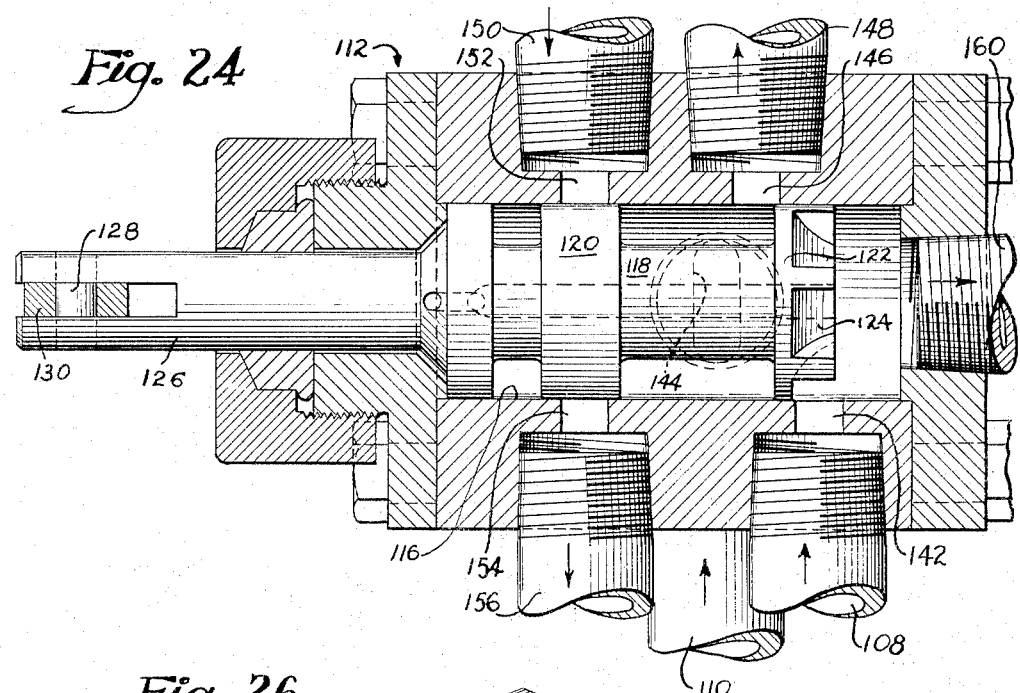
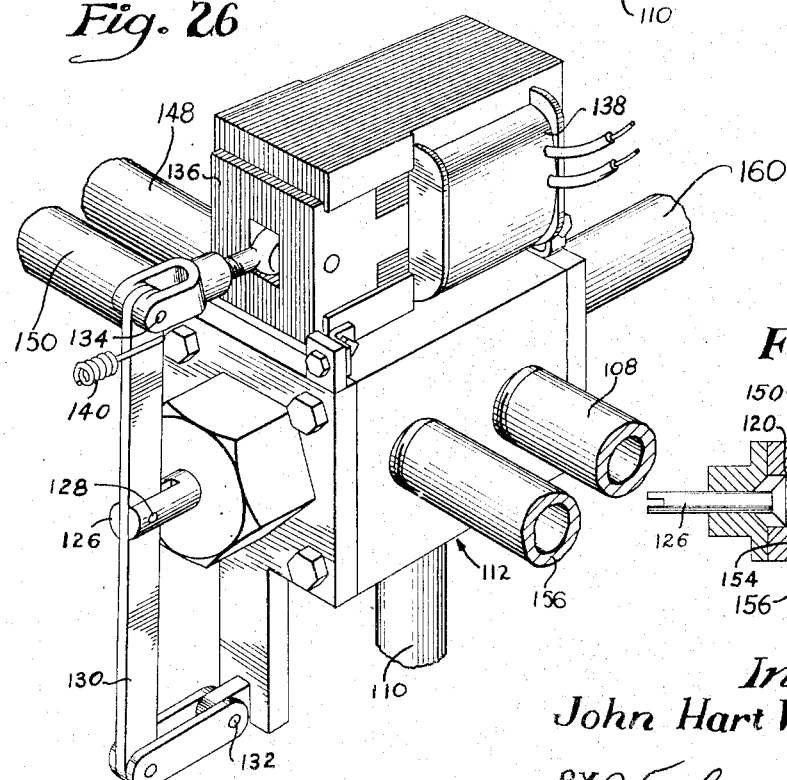
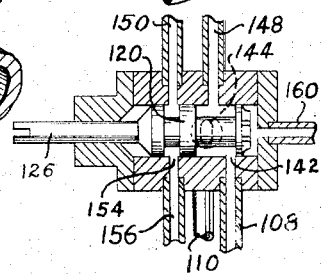
Inventor
John Hart Wilson
BY Wayland D Keith
HIS AGENT.

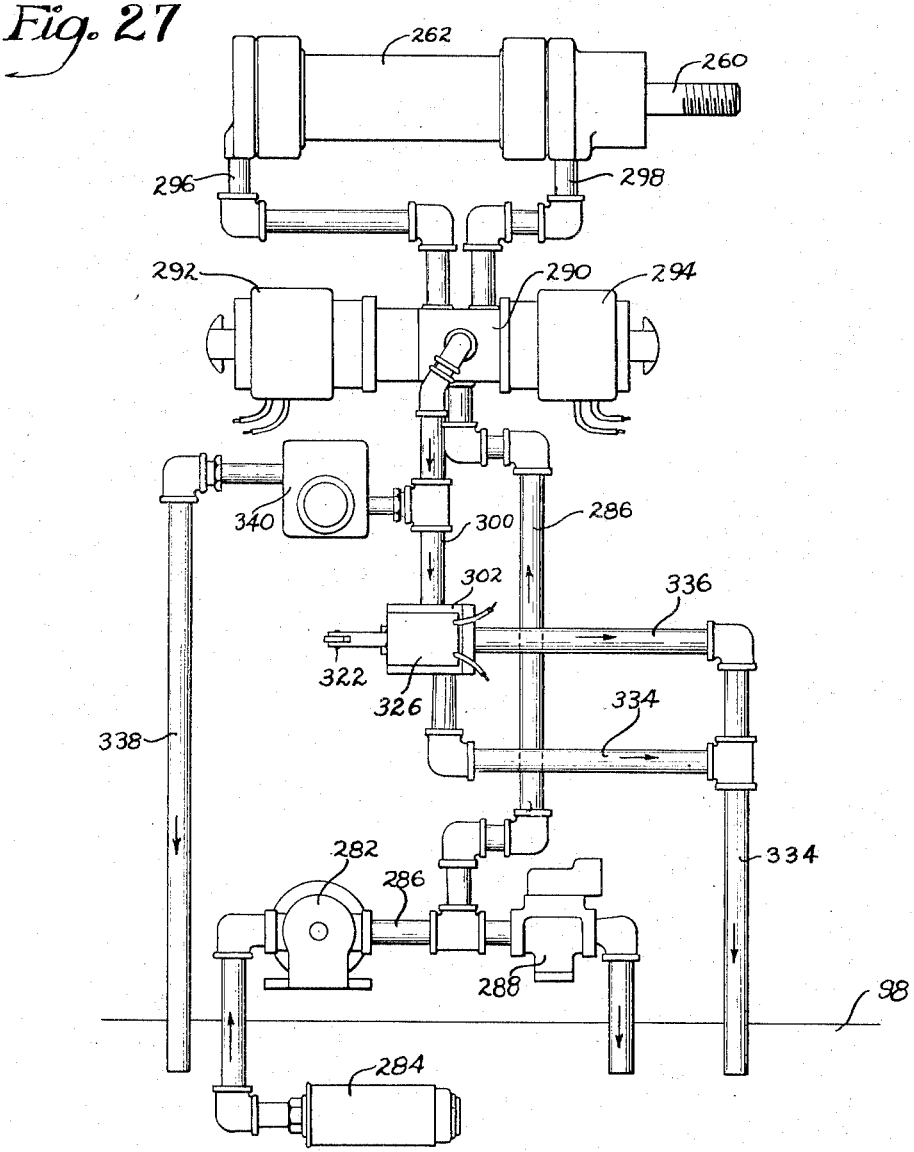

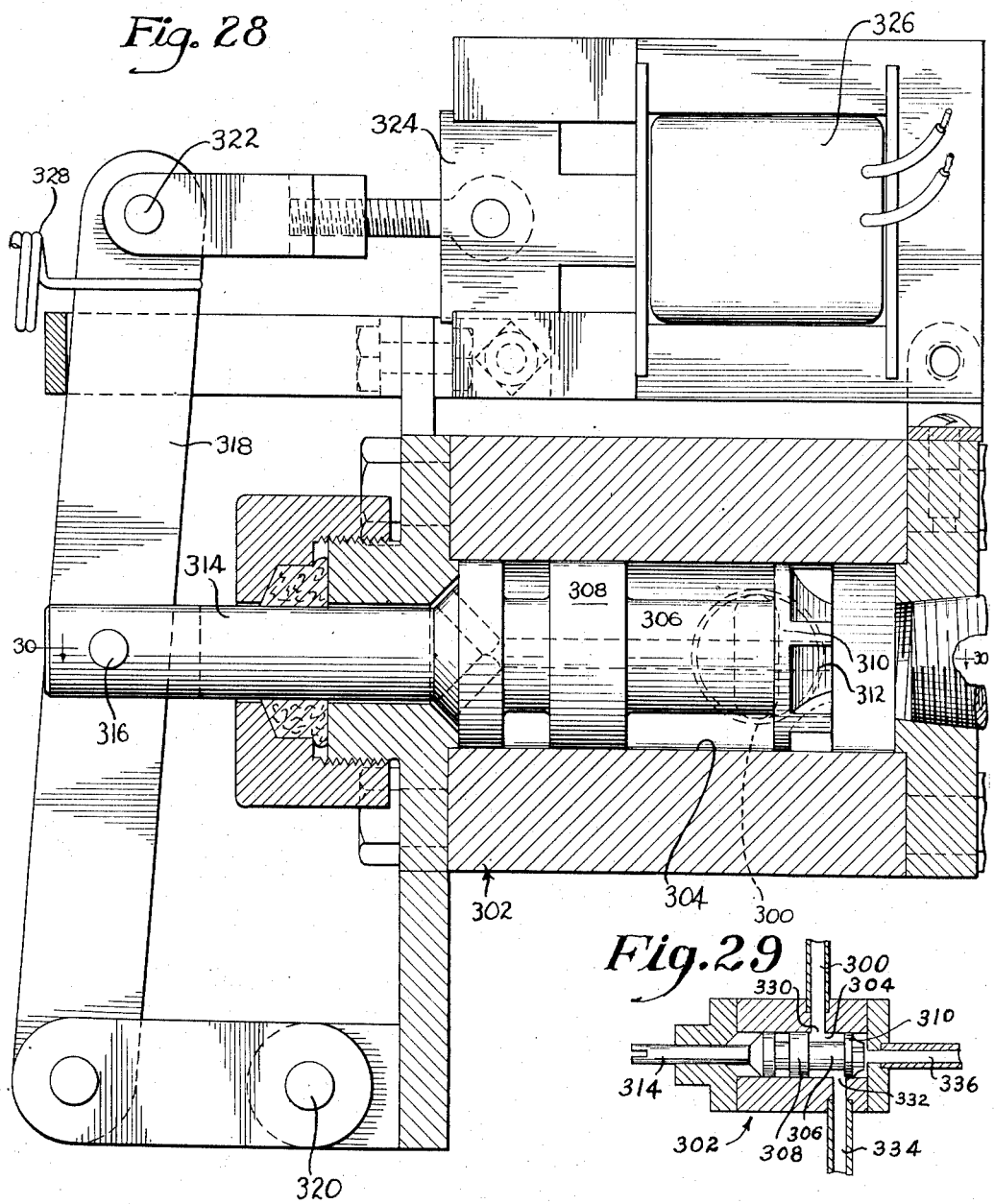
Sept. 1, 1953   J. H. WILSON   2,650,417
TURRET LATHE
Filed June 5, 1947   23 Sheets-Sheet 21
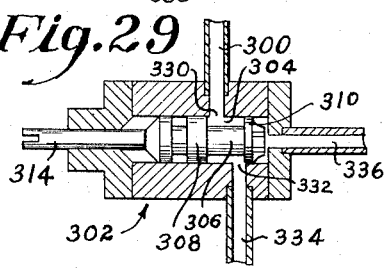
Inventor
John Hart Wilson
By
Wayland D. Keith
HIS AGENT.

Sept. 1, 1953   J. H. WILSON   2,650,417
TURRET LATHE

Filed June 5, 1947   23 Sheets-Sheet 22

Inventor
John Hart Wilson
BY *Wayland D Keith*
HIS AGENT.

Sept. 1, 1953  J. H. WILSON  2,650,417
TURRET LATHE

Filed June 5, 1947  23 Sheets-Sheet 23

INVENTOR.
John Hart Wilson
BY
Wayland D. Keith
HIS AGENT.

Patented Sept. 1, 1953

2,650,417

UNITED STATES PATENT OFFICE 2,650,417

TURRET LATHE

John Hart Wilson, Wichita Falls, Tex.

Application June 5, 1947, Serial No. 752,588

2 Claims. (Cl. 29—50)

This invention relates to improvements in turret lathes, and more particularly to mechanism for controlling the operation of a turret lathe.

Turret lathes have been provided heretofore, operated hydraulically for moving the main carriage and cross carriage, but the controls for operating such movements have not been entirely satisfactory for various reasons, including the difficulty of regulating the respective movements whereby a complete stroke of the main carriage must be effected before a change of operation can be initiated.

One object of this invention is to improve the control mechanism for regulating the reciprocating movements of the main carriage and cross carriage of a turret lathe in rapid traverse and feeding movements.

Another object of the invention is to so control the operation of the main carriage and cross carriage of a turret lathe so that these will be co-related in function for performing their respective operations on the work to provide a complete cycle of movements which follows automatically once the action is initiated.

Another object of this invention is to provide for the control of the respective actions of the machine electrically, as by means of switches, which will insure of successive operations in properly timed relation and in proper sequence to each other whereby the machine will perform automatically the respective cutting actions desired.

Still another object of the invention is to so control the step by step indexing of the turret that the latter will be reset for a second operation automatically without the necessity for movement of the main carriage throughout its entire stroke, which effects a material saving in time of the operator and greatly improves the function of the lathe.

A further object of the invention is to provide separate controls for the direction of travel and for the speed of travel, particularly in a hydraulically operated lathe, whereby the direction of travel of the carriage will be controlled by one valve, while the speed of travel will be controlled by another valve, as in rapid traverse or feed.

A further object of the invention is to utilize one or more cam barrels to perform several functions, as to vary the rate of feed of the ram, as from traverse to feed; to change the direction of feed; to change the end of travel of the carriage; and to change the point of movement of the cross carriage.

These objects may be accomplished, according to one embodiment of the invention, by operating the main carriage and cross carriage by hydraulic power devices or rams. Control valves are provided to regulate the actions of the respective control devices to accomplish the respective movements of the main carriage and cross carriage in proper sequence and to the desired extent.

By regulating the actions of the valves electrically these may be moved under the control of switches which will provide the desired automatic control of the entire series of operations without the necessity for manually or mechanically regulating the valves by direct action. Moreover, the controls may be placed at suitable points to provide the desired setting of the valves that will cause the indexing of the turret to its necessary cutting position without the necessity for movement of the main carriage throughout its return stroke, which carriage may be reversed if desired at various points in its travel.

Separate solenoid-operated valves are provided, in the preferred embodiment of the invention, one of which will change the direction of travel of the hydraulic power device that moves each carriage, and another will control the speed of travel of the carriages.

This embodiment also includes one or more cam barrels which will control several functions, as, (a) vary the direction of travel of the respective carriages or either of them; (b) change the rate of movement thereof, as from rapid traverse to slow or feed; (c) change the point of travel of the main carriage at which the cross carriage starts its movement; and (d) change the end point of travel in one direction of either carriage. These respective controls preferably are electrically actuated, being initiated by switches moved by cams or push fingers attached to the cam barrel or carriage. Provision is made for a sufficient number of cams and fingers to perform the respective functions.

This embodiment of the invention is illustrated in the accompanying drawings in which:

Fig. 5 is a longitudinal vertical section through the lathe, taken on the line 5—5 of Fig. 3;

Fig. 6 is a vertical section therethrough, partly in elevation, taken on the line 6—6 of Fig. 1;

Fig. 7 is a similar view showing the cross carriage mechanism, on the line 7—7 of Fig. 1;

Fig. 8 is a vertical cross section through one of the cam barrels and its associated mechanism, on the line 8—8 of Fig. 1;

Fig. 9 is a longitudinal section therethrough, taken on the line 9—9 of Fig. 8;

Fig. 10 is a similar view taken on the line 10—10 of Fig. 8;

Fig. 11 is a longitudinal section through the other cam barrel, on the line 11—11 of Fig. 3;

Fig. 12 is a detail cross section of the feed valve control regulated by the main cam barrel, on the line 12—12 of Fig. 10;

Fig. 13 is a view similar to Fig. 11 on a different plane, on the line 13—13 of Fig. 3;

Fig. 14 is a horizontal sectional view therethrough showing the main carriage return and cross carriage starting switches, on the line 14—14 of Fig. 13;

Fig. 17 is a longitudinal section through the turret and its locking mechanism on the line 17—17 in Fig. 3;

Fig. 17A is a fragmentary sectional view taken on the line 17A—17A of Fig. 19 looking in the direction indicated by the arrows;

Fig. 18 is a detailed cross section therethrough, on the line 18—18 of Fig. 17;

Fig. 24 is a horizontal section therethrough, on the line 24—24 of Fig. 22, showing the valve in one position;

Fig. 25 is a diagrammatic view of the valve in the opposite position;

Fig. 26 is a perspective view of said valve;

Fig. 27 is a diagrammatic view of the hydraulic system for the cross carriage;

Fig. 28 is a vertical section, partly in elevation, through the main control valve thereof;

Fig. 29 is a diagrammatic view thereof in one position;

Figure 1:
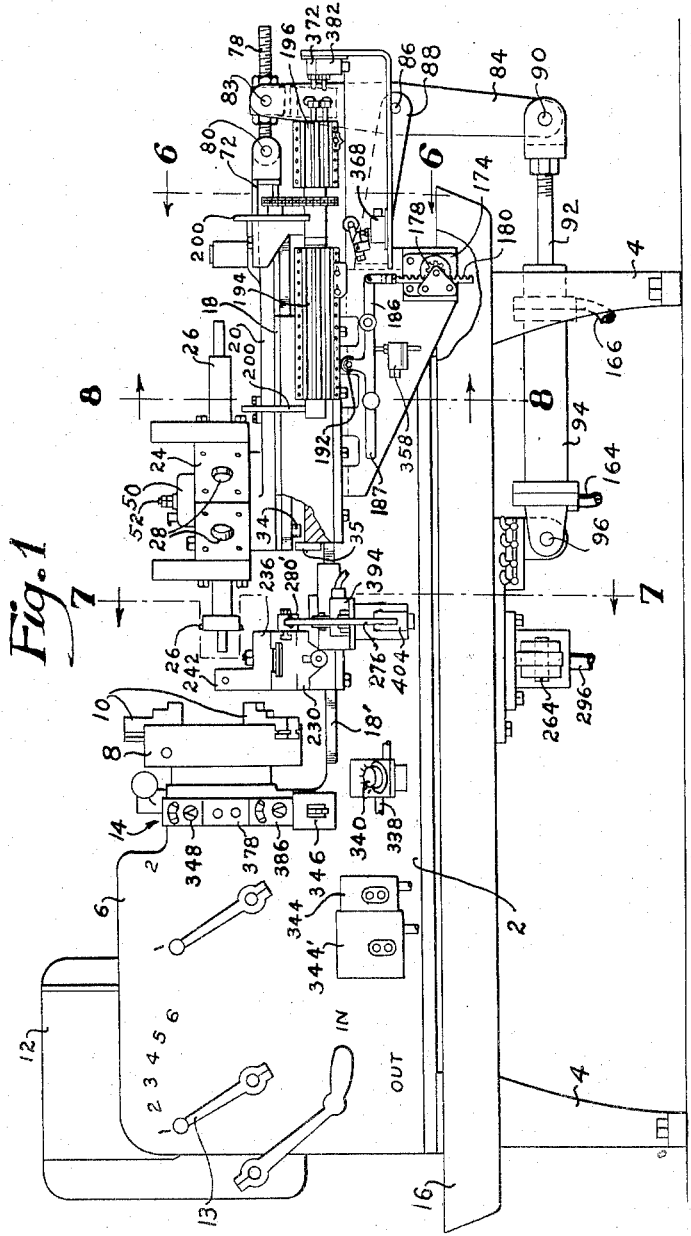
Fig. 1 is a side elevation of a turret lathe from the front thereof, showing one embodiment of the invention applied thereto, with the hydraulic system broken away.
Figure 2:
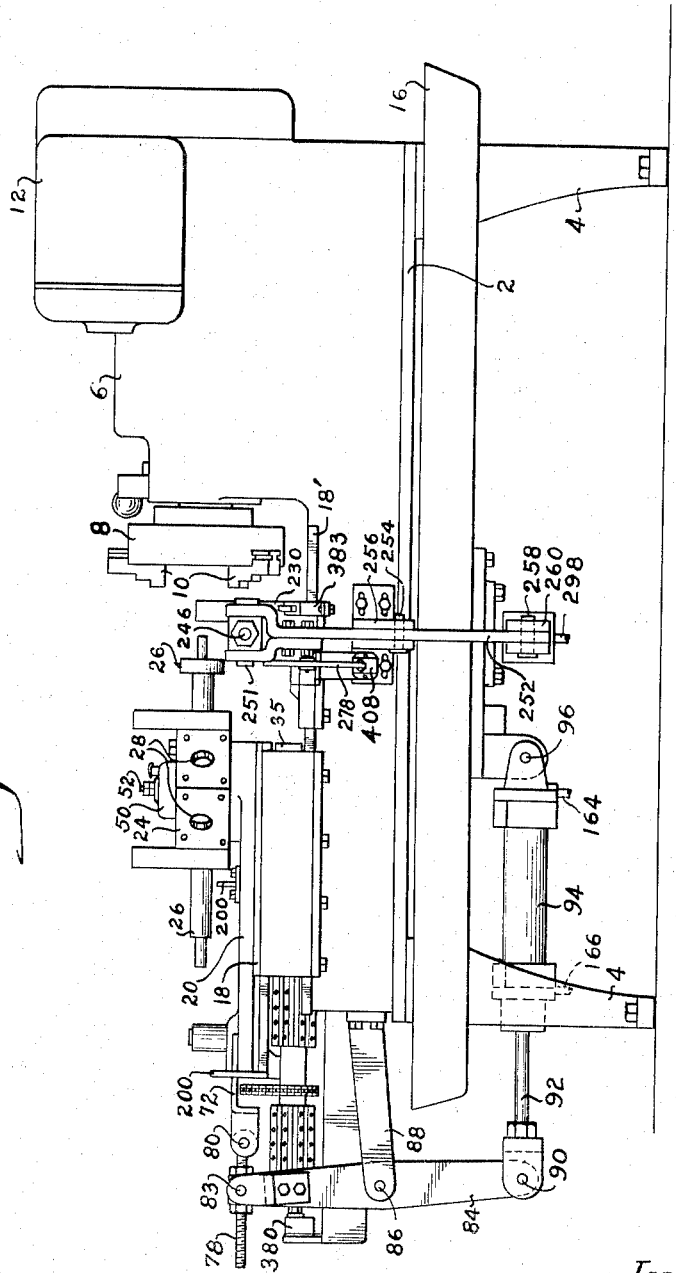
Fig. 2 is a similar view from the opposite side of the lathe.

The invention is shown as applied to a turret lathe in which the main bed of the machine is designated generally by the numeral 2 and is adapted to be supported on legs 4. Supported upon the bed 2 is the usual headstock 6 within which is mounted suitable mechanism for operating a work holder, shown in the form of a chuck 8 having the usual work clamps 10 adjustably mounted therein and adapted to receive and hold the work during the cutting operation.

The operating mechanism for rotating the chuck 8 is driven by an electric motor 12 through suitable clutches and controls, generally indicated in Fig. 1, which, being well understood in the art, need not be described in detail. The electric motor 12 itself may be controlled in its actions by control means generally indicated at 13. A main electrical control panel is shown at 14 on the front of the machine.

The bed 2 is provided with a drip pan 16 to catch the cooling fluid from the lathe, although the device for flowing a cooling oil or fluid over the work is not illustrated.

*Main carriage and turret*

Figure 19:
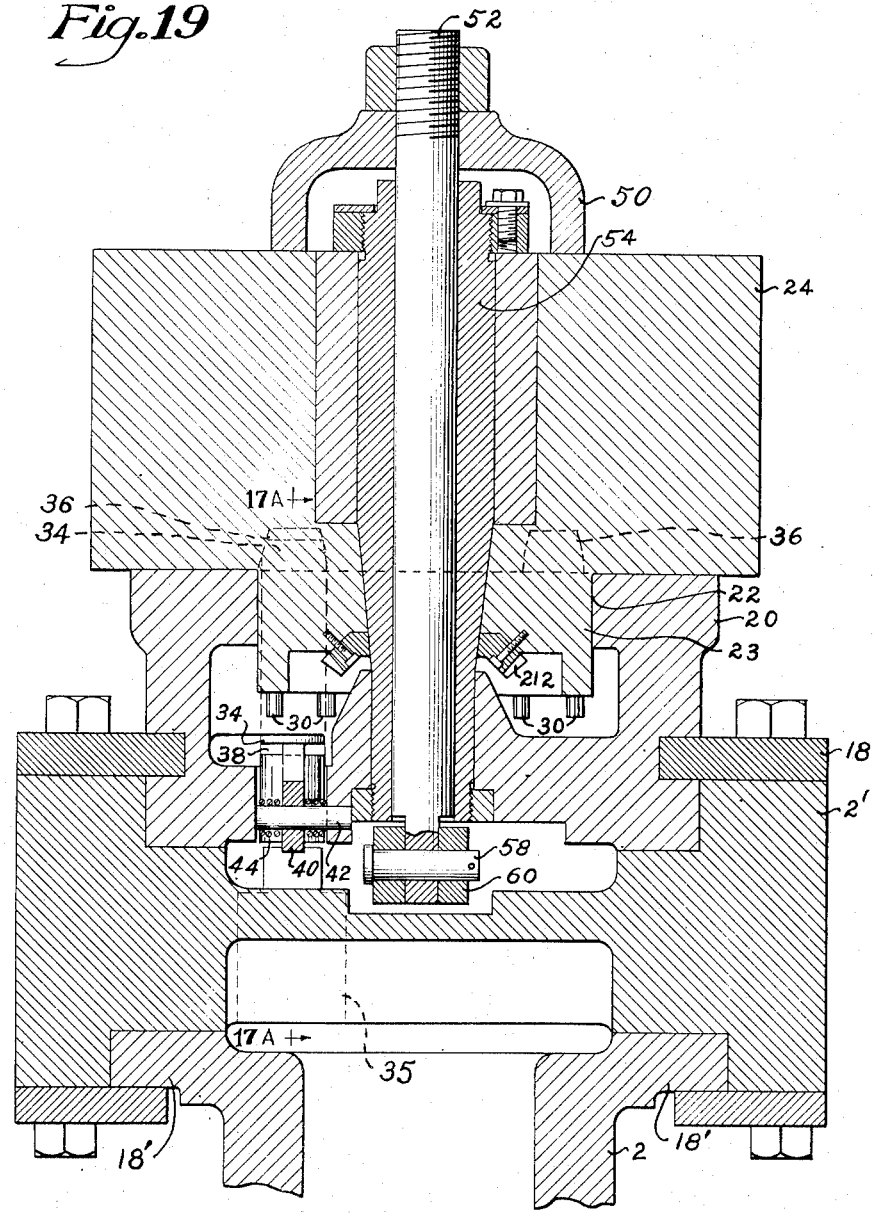
Fig. 19 is a cross section through the turret, on the line 19—19 of Fig. 17.

Extending lengthwise of the bed 2, along opposite sides thereof, are ways 18 on which the main carriage 20 is slidably mounted in the usual manner, as shown in Figs. 5, 6, and 19. The bed 2 may be provided with one or more fixed abutments 21 thereon in the path of travel of the carriage 20 to form a positive stop for the carriage at the limit of its forward movement. (See Fig. 7.)

Referring to Figs. 17 and 19, the main carriage 20 is shown as having a bearing 22 in the upper side thereof, within which is journaled a depending portion 23 of the turret 24, the body of the turret being seated upon the carriage 20.

Figure 20:
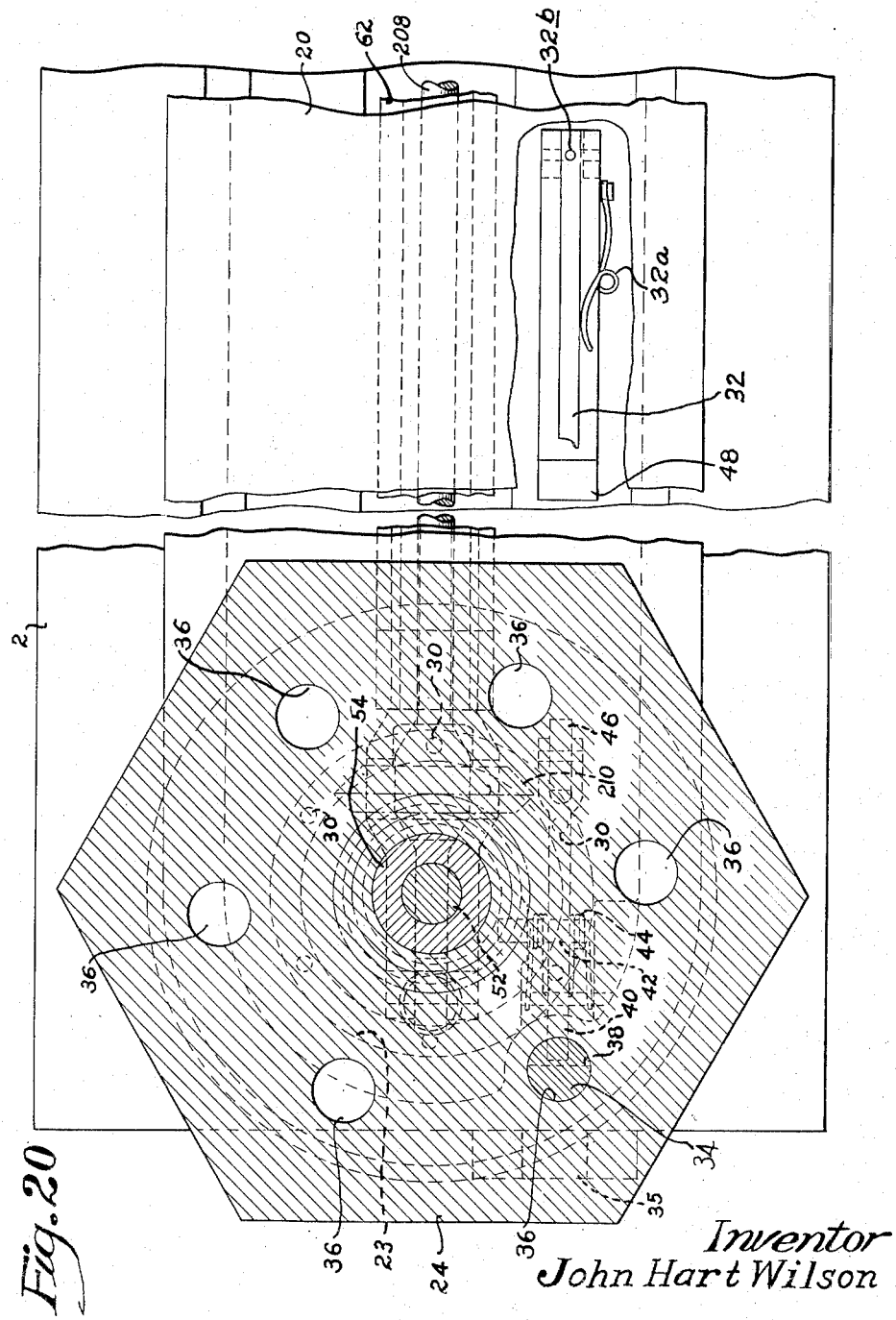
Fig. 20 is a horizontal section therethrough, on the line 20—20 of Fig. 17.

The turret 24 is of hexagonal form, as illustrated in Figs. 1 and 20, merely for purpose of illustration, and is adapted to receive a plurality of tools, such as cutters indicated generally at 26 in Fig. 1. These tools are mounted in the usual sockets 28 in the respective faces of the turret 24. The turret 24 is adapted to be rotated step-by-step automatically from one position to another and to assume substantially six different cutting positions in a cycle of operation of the automatic lathe, to move the respective cutting tools carried thereby into operative positions.

The turret 24 is adapted to be rotated step-by-step, moving one step for each backward reciprocation of the main carriage 20. This turning movement is accomplished by pins 30, one positioned to correspond with the center of each face of the turret, being spaced about the axis thereof, as shown in Fig. 20. Each pin 30 projects downwardly from the depending portion 23 of the turret 24, into the path of displaceable spring-pressed lever or finger 32 pivotally mounted on the bed with its pin-contacting free end directed toward the respective pins 30. Thus, when the carriage moves back in its return stroke, the pin 30 will engage the finger and rotate the turret 24 through one step. A spring 32a is secured to a side of cam member 48 so as to have a tendency to move the lever 32 about pivot point 32b to permit arcuate movement of the lever 32 when in engagement with a pin 30 to enable rotation of turret 24.

The turret 24 is adapted to be locked in its operating position by a lock-pin 34 slidably mounted in the carriage 20 in position to engage progressively in each of the openings 36 (Fig. 20) formed in the bottom face of the turret 24, to hold the turret against rotation during the cutting stroke. The pin 34 extends downward slidably in the carriage 20 and has a notch 38 in its lower end portion, as shown in Fig. 17A and Fig. 19, in position to be engaged loosely by one end of a lever 40 pivotally mounted at 42 in the carriage 20. A spring 44 acts on the lever 40, normally tending to urge the pin 34 in an upward direction into engagement with an opening 36 when the turret 24 is turned to an operating position. The back end portion of the lever 40 carries a roller 46, as shown in Fig. 20, in position to engage a cam 48 fixed to the bed 2, upon the movement of the carriage in its backward stroke.

A safety stop 35 is provided on the front end portion of adjustable portion 2' of the bed 2 and is secured thereto by bolts 37 (Fig. 17A). This safety stop 35 projects above the upper surface of adjustable bed portion 2' a sufficient distance to engage the lower end of lock pin 34 when passed thereover, if the lock pin is not properly seated in the opening 36 formed in the bottom face of the turret 24. This safety stop 35, in the path of the pin 34, insures the turret 24 being properly indexed. If the turret 24 is not properly indexed the carriage 20, carrying the turret and tools thereon, cannot pass beyond the safety stop 35 to improperly engage the turret or tools with a rotating chuck 8 or with the moving cross carriage. If the improperly indexed turret and tools were not stopped by the safety stop 35, great damage to the machine would result.

The safety stop 35, as well as the slide pin 34, are of sufficient strength to withstand the maximum pressure exerted by the hydraulic ram, without such pressure resulting in any damage to the working parts of the lathe.

It is preferred that the turret 24 be held down tightly in rigid relation to the carriage 20 during the cutting operation in addition to the holding action of the pin 34. Accordingly, a cap 50 is provided in engagement with the top face of the turret 24 for this purpose. The cap 50 is carried by a rod 52 fixed thereto at its upper end, and which rod extends through the turret 24 in a guide-sleeve 54 therein, as shown in Fig. 17. The sleeve 54 extends downward through the carriage 20 and is fixed against rotation with respect thereto by a key 56. The rod 52 projects through the sleeve 54 at the lower end of the latter.

The lower end of the rod 52 is pivoted at 58 to a horizontally projecting arm 60 forming a part of and extending in off-set relation to a lock operating lever 62 that extends through the carriage 20 above the bed 2. The lock lever 60—62 is pivotally mounted at 64 at the forward end of the arm 60 on the carriage, and normally is urged in a downward direction by a stiff coiled spring 66 which acts on the rearward end of the turret lock clamping lever 62. This spring 66, normally urging the rearward end of the lever 62 in a downward direction, will act on the rod 52 to pull downward on the cap 50, tending to hold the cap in secure locked relation with the turret 24, pressing the latter downward upon the carriage 20, thereby effectively locking the turret in its set operating position against accidental shifting movement during the cutting stroke.

The cap 50 should be lifted to loosen its holding relation with the turret 24 during the step-by-step turning movement of the latter under the action of the finger 32 acting on one of the pins 30 (Fig. 20), when the locking pin 34 is withdrawn from its opening 36. This lifting of cap 50 may be accomplished by providing a roller 68 journaled within the slot in the arm 60, in position to ride upon a cam plate 70 provided on the upper surface of the bed 2, as shown in Fig. 17. When the carriage 20 has been moved back until the arm 60 has moved to the dotted line position shown in Fig. 17, the roller 68 will ride up on the upper face of the cam plate 70 to the point indicated in dotted lines, thereby lifting the clamping lever 62 against the tension of the spring 66, moving the rod 52 upward and thereby moving the cap 50 out of holding relation with the top face of the turret 24. This will loosen the holding action of the cap simultaneously with the withdrawal of the pin 34, and thereby allow turning movement of the turret 24 to its next operating position by engagement of the corresponding pin 30 with the finger 32.

Figure 3:
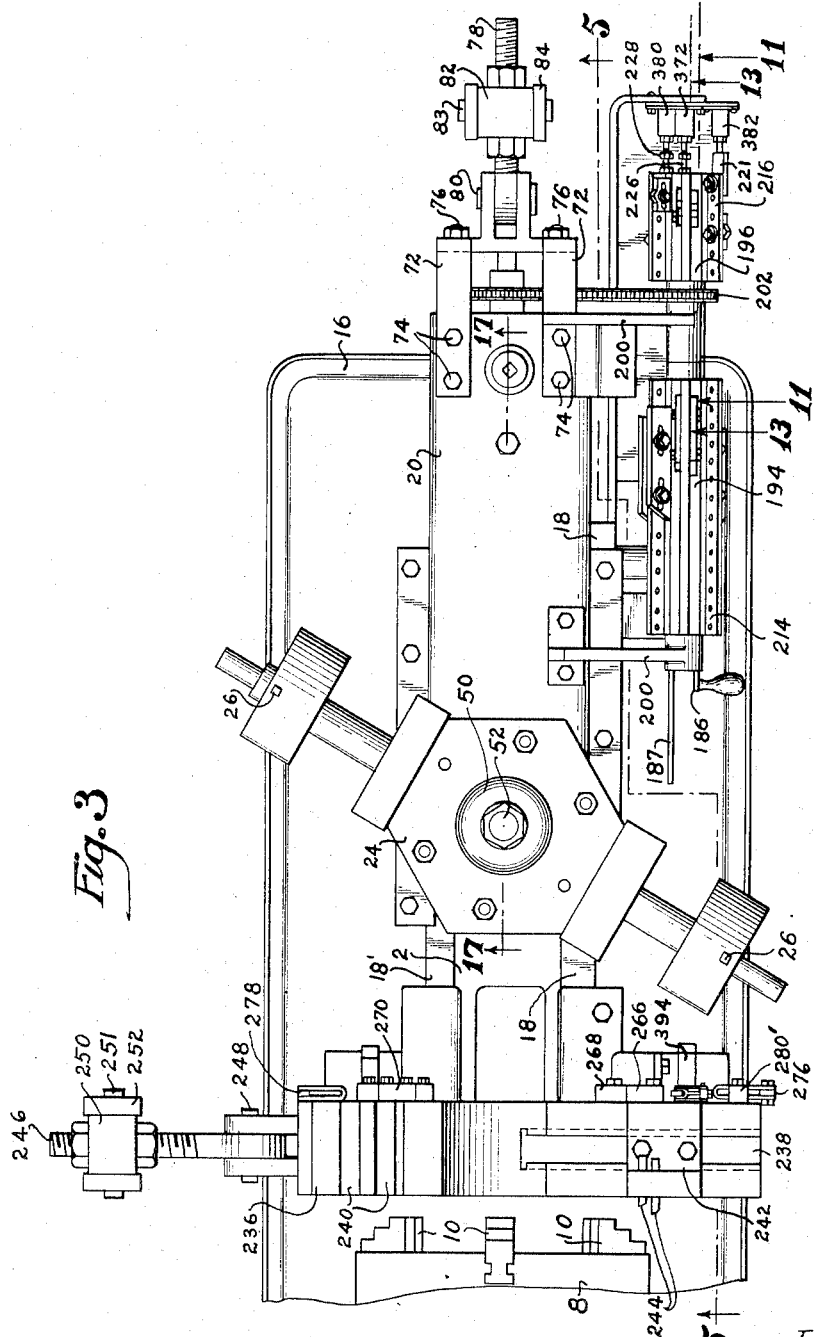
Fig. 3 is a fragmentary top plan view thereof.
Figure 4:
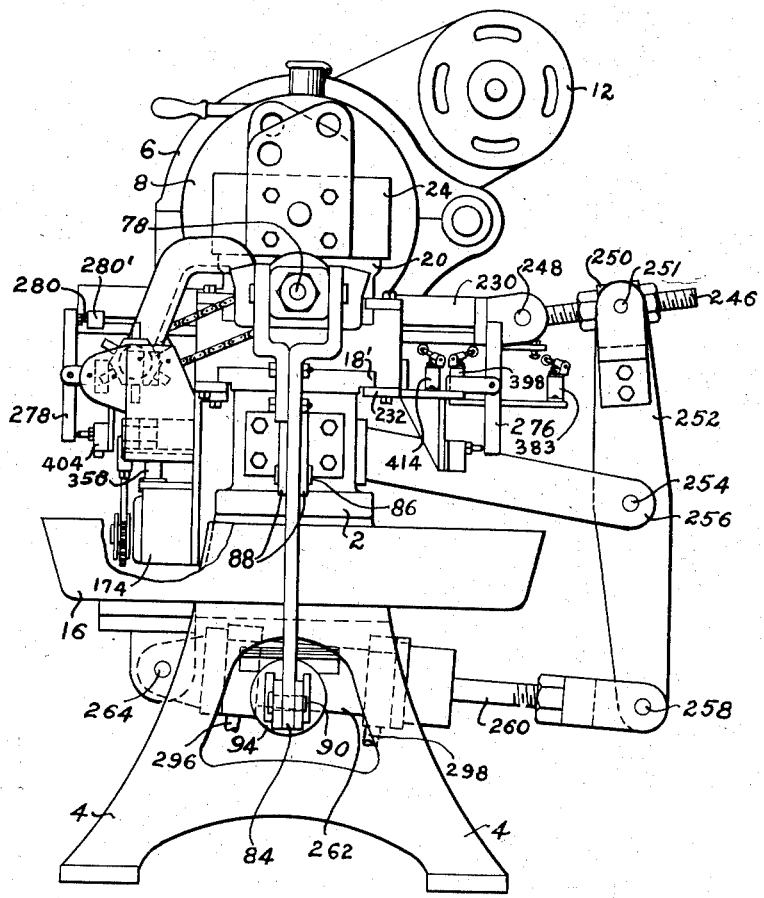
Fig. 4 is an end elevation thereof, with the hydraulic system broken away.

The main carriage 20 is adapted to be reciprocated hydraulically, in the form illustrated, by the connection of the hydraulic means with the rearward end thereof, as illustrated generally in Figs. 1 to 5. While the hydraulic means may be attached directly at the rearward end of the carriage 20, the hydraulic power device or ram, in the form illustrated, is shown as mounted beneath the bed, and connected in operating connection with the carriage through linkage. In this form as illustrated, a bracket 72 is fixed to the upper surface of the carriage 20, as shown in Fig. 3, and projects outwardly therefrom, being secured rigidly to the carriage by screws 74 and bolts 76. This bracket 72 forms a pivotal connection with the carriage by an eye-bolt 78 that is pivoted at 80 to the bracket 72 (Fig. 5).

The eye-bolt 78 extends through a swivel block 82 journaled at 83 in the upper end of a lever 84. The lever 84 is pivotally mounted at 86 in a bracket 88 secured to one end of the bed 2, as shown in Fig. 5. The lower end of the lever 84 is pivotally connected at 90 with the piston rod 92 of a hydraulic power device or ram, generally indicated at 94 and comprising a cylinder having a piston therein fixed to the piston rod 92. The hydraulic power device 94 is disposed beneath the bed 2 in the form illustrated, and is pivotally supported on the bed at 96.

*Main carriage hydraulic system*

The hydraulic power device 94 is adapted to be supplied with fluid, preferably oil, alternately at the opposite ends thereof for causing reciprocating movement of the pitson of the power device to move the carriage 20 lengthwise in the desired direction and through the desired stroke. The hydraulic system for accomplishing this action is shown more in detail in Fig. 21. This hydraulic system has been omitted from the other views for clearness of illutsration.

The oil for the hydraulic power device 94 is withdrawn from a tank 98 mounted adjacent the bed of the machine. In the present invention separate high and low volume electric motor driven pumps are used, as designated respectively at 100 and 102, for rapid traverse and slow or feed strokes, respectively, the pump 100 having a capacity of about ten to one as compared with the pump 102. The advantage of this present hydraulic system in the use of two pumps for the operation of the main carriage is that one is of high volume and low pressure, which requires a minimum of horsepower for the amount of fluid handled, and the other pump being of small volume but high pressure may also be operated efficiently with a minimum of horsepower. Since the effective maximum work of both pumps is not called on simultaneously, these pumps may be operated by the same motor, as may be the pump which is used to operate the cross carriage hydraulic system. The pumps 100 and 102 withdraw the liquid through filters 104 and 106 from the tank 98 and discharge the liquid through pipes 108 and 110 to a solenoid-controlled feed valve, generally indicated at 112.

A pressure relief valve is shown at 114 connected with the pipe 110 at the discharge side of the pump 102, which relief valve 114 discharges back into the tank 98, for by-passing any excess fluid pressure thereto.

Figure 22:
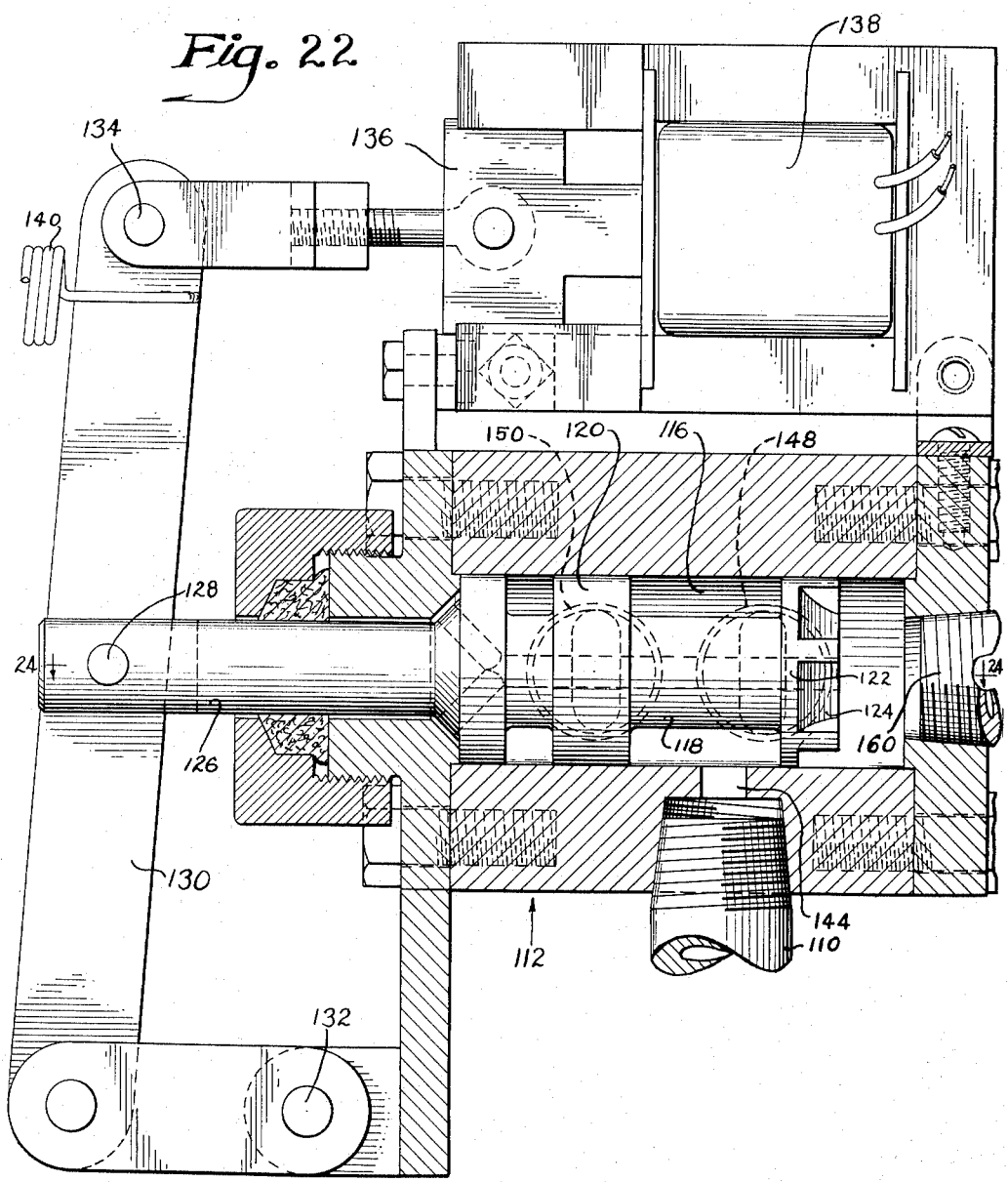
Fig. 22 is a vertical section, partly in elevation, through the feed control valve thereof.
Figure 23:
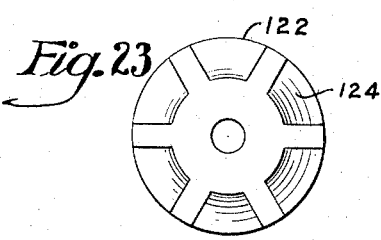
Fig. 23 is an end elevation of the valve disc.

The valve 112 is shown more in detail in Figs. 22 to 26. This valve 112 includes a cylinder 116 having a piston valve element 118 slidably mounted therein. The piston member comprises discs 120 and 122, the disc 122 having notches 124 therein, as shown in Figs. 22 and 23, to allow some flow thereby when the disc is partly over the inlet port.

The valve piston 118 is connected with a piston rod 126 pivotally attached at 128 to a lever 130. The lever 130 is pivotally connected at 132 at one end thereof with the housing of the valve 112, while the opposite end of the lever 130 is pivotally connected at 134 to the core 136 of a solenoid 138. The solenoid 138 is mounted on the housing of the valve 112 with the core 136 extending therein, which core normally is urged in an outwardly direction by a spring 140 acting thereon, as shown in Fig. 22.

Figure 21:
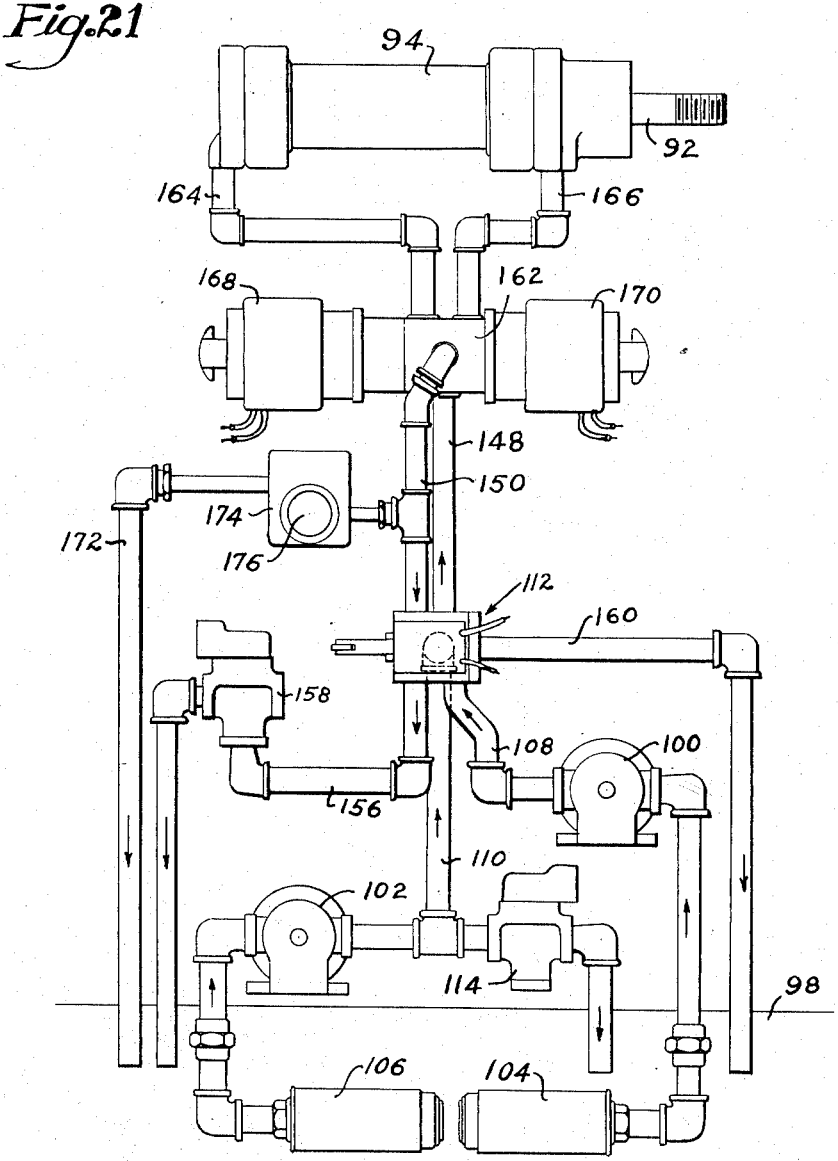
Fig. 21 is a diagrammatic view of the hydraulic system for operating the main carriage.

The cylinder 116 is provided with a plurality of inlet and outlet ports controlled by the discs 120 and 122. An inlet port 142 registers with the pipe 108, while an inlet port 144 registers with the pipe 110. These ports 142 and 144 admit liquid from the respective pumps 100 and 102 into the cylinder 116 between discs 120 and 122 (Fig. 25). This fluid is discharged from the cylinder 116 to the hydraulic power device through a port 146 connected with the pipe 148. The returned fluid from the power device is directed to the valve 112 through a pipe 150 and a port 152 and is discharged from the cylinder through a port 154 and a discharge pipe 156. The discharge pipe leads back to the tank 98 and contains a pressure relief valve 158 (Fig. 21).

The ports 152 and 154 are closed by the valve disc 120 when the solenoid 138 is de-energized. The direction of flow through port 142 is controlled by valve disc 122 which directs fluid into cylinder 116 and out through pipe 160 when the solenoid 138 is de-energized, and the valve 118 is in one extreme position, as indicated in Fig. 24. In this position of the valve, the fluid entering the cylinder 116 through pipe 108 from pump 100 will be diverted by disc 122 into pipe 160 and will be discharged therethrough back into tank 98.

The pipe 148 is connected with a second solenoid-controlled valve 162 (Fig. 21), having pipes 164 and 166 leading therefrom to the respective opposite ends of the cylinder of the hydraulic power device or ram 94, alternately, for the supplying and discharging of fluid from the power device to the valve 162. The valve 162 contains a piston valve similar to that indicated at 118 and is operated by solenoid 168 and 170 at the respective opposite ends thereof.

Connected with the pipe 150 intermediate the valves 122 and 162 is a discharge pipe 172 leading back to the tank 98 for by-passing the fluid thereto on the feed stroke. The pipe 172 contains a feed control valve 174 therein. The valve 174 contains a rotary valve control member and is mounted on one side of the bed 2 of the machine, as shown more in detail in Figs. 8, 10 and 12.

The stem of the valve 174 is indicated at 176 and is adapted to be operated by a pinion 178 and a rack 180 meshing therewith and held in guided relation with the pinion by guide rollers 182 journaled on a side of the valve 174. The rack 180 is pivotally connected at 184 at its upper end to one end of a lever 186. The lever 186 is pivotally mounted at 188 on one side of the bed 2 of the machine. A spring 190 acts on the end of the lever connected with the rack 180 normally tending to urge said end and rack in a downward direction to close the valve 174. The opposite end of the lever 186 carries a roller 192 in position to be depressed by control cams.

The pumps 100 and 102 operate continuously, and withdraw the liquid from the tank 98, directing it to the valve 112 through the lines 108 and 110 respectively.

With the solenoid 138 energized, the piston valve 118 will be in the position shown in Fig. 25. The liquid will be admitted to the valve cylinder from both the pipes 108 and 110 through the ports 142 and 144, and will be discharged from the valve cylinder 116 through the pipe 148 to the valve 162, thence to one side or the other of the hydraulic power device 94, according to the position of the valve 162 as controlled by the solenoids 168 and 170 (Fig. 21).

The returning liquid from the hydraulic power device will pass through the pipe 150, through the valve ports 152 and 154, and discharge through the pipe 156 and the low pressure relief valve 158, back to the tank 98.

This will be the position of the parts in rapid traverse. The valve 174 will be partially closed, and fast movement of the ram will be effected, due to the high volume operation of the power device under the action of the pumps 100 and 102.

When the solenoid 138 is de-energized, the piston valve 118 will be shifted to the position shown in Fig. 24 by action of spring 140. In this position, the valve disc 122 will be moved over between the valve ports 142 and 146, whereby the fluid from the high volume pump 100 will be directed through pipe 108 and by-passed to the tank 98 through the pipe 160. The low volume pump 102 will direct the liquid through the pipe 110, the port 144 and the discharge pipe 146, to the pipe 148, to the valve 162, thence to one end of the hydraulic power device 94. In this position the ports 152 and 154 are closed by the valve disc 120, but the valve 174 is open to discharge a restricted metered amount of hydraulic fluid from the opposite end of the hydraulic device 94. The fluid is discharged from the valve 174 into pipe 172 which directs the fluid from the pipe 150 back to the tank 98. This will provide for slow movement of the ram or power device 94 due to the comparatively small volume of fluid forced out of the ram, effecting only slow travel thereof and of the carriage.

Cam barrel controls

The operation of the machine is adapted to be controlled automatically by switches which are actuated by control cams and fingers carried by the cam barrels indicated respectively at 194 and 196, as shown in Figs. 1 and 3, and more in detail in Figs. 6 and 8 to 16. The cam barrels 194 and 196 are keyed to a shaft 198, which shaft 198 is journaled in arms 200 suspended from the carriage 26 at one side thereof.

The cam barrels 194 and 196 are adapted to be rotated in timed relation with the step-by-step movement of the turret 24. Accordingly, these cam barrels are actuated by the turning movement of the turret. To accomplish this rotation, I have provided a sprocket wheel 202 keyed to the shaft 198 and connected by a sprocket chain 204 (Fig. 6) with a sprocket wheel 206 (Fig. 17) keyed on a shaft 208 that extends lengthwise through the carriage 20 and through the turret lock operating lever 62, as shown in Fig. 17. The forward end of the shaft 208 carries a bevel gear 210, meshing with a bevel gear 212 fixed to the depending portion 23 of the turret 24. Therefore, as the turret 24 is rotated, as above described, such rotating movement will be imparted through the shaft 208 and the chain 204 to the shaft 198 on which the cam barrels 194 and 196 are fixed.

Each of the cam barrels 194 and 196 is provided with radial plates or ribs 214 and 216, respectively, on which cams 218 and 220 are secured by bolts 222 and 224. The character and positions of the cams 218, 218', 220, 220' and finger 221 will depend upon the character of the work to be performed on the machine and the timed relation of the respective operations. These cams are adapted to operate switches as hereinafter described, for regulating the automatic operation of the machine. The cam 218 on barrel 194 operates the hydraulic valve 174 to regulate the rate of flow of fluid therethrough, which regulates the rate of feed of the main carriage 20. The cam 218' operates the switch 358, which in turn operates solenoid 138 to shift valve 118 from the feed position shown in Fig. 24 to the rapid traverse position shown in Fig. 25, which initiates the forward rapid traverse of the main carriage 20. Switch 387 is operated by cam 220' to close a circuit through solenoid 138 which moves valve 118 into rapid traverse position, as shown in Fig. 25, on the return or rearward movement of the carriage 20.

Figure 15:
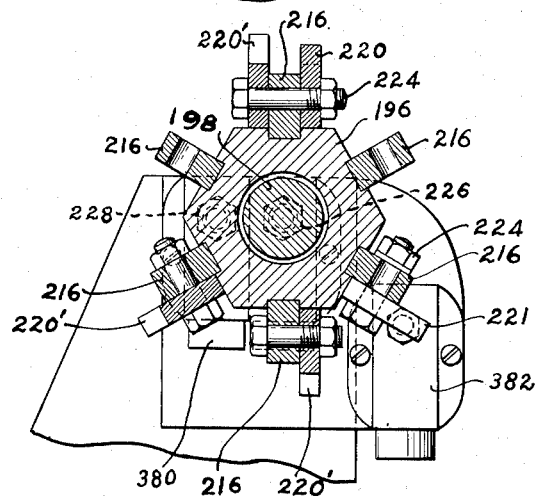
Fig. 15 is a cross section through one of the cam barrels, on the line 15—15 of Fig. 13.
Figure 16:
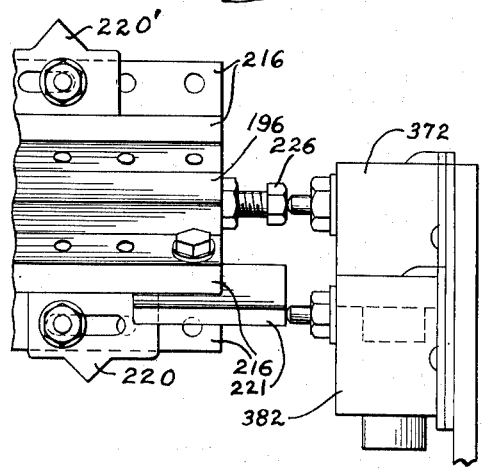
Fig. 16 is a side elevation thereof.

As shown in Fig. 15, these control cams 218 and 220 may be mounted on either or both sides of the ribs on the cam barrels and may be adjustable lengthwise thereof, as shown in Fig. 10, or fingers 221, 226 and 228 may project rearwardly from the cam barrel 196. These fingers may be so shaped as to provide for momentary operation of the switches, or for delay and further actuation, as shown by fingers 221 at the bottom of cam barrel 196 in Fig. 16. Fingers 221, which operate switch 382, may be installed on any or all of the ribs 216 to obtain delay of the main carriage on the desired operating stations. This delay remains until started by closing switch 383 at the end of the "in" stroke of the cross carriage by cam 274. Both switches are open to cause this delay (Fig. 7).

The height of the cams 218 which actuate the hydraulic metering valve 174, may be varied to control the rate of feed of the carriage, as the higher the cam the higher the rate of feed. The cam 218 may be shaped, if desired, so that the feed may be slow or fast for a predetermined distance then changed, or it may be sloped either way of give a direct variation of feed according to the work. When the speed of operation is controlled by cams of fixed shape in this manner, the feed of the machine cannot be decreased by the operator, as has been a frequent objection with machines available heretofore.

Therefore, it is evident that the machine is capable of a wide variation of operation according to the nature and character of the cams used, substantially all desired operations being controlled automatically.

The cam barrel 196 also carries axially or axially aligned projecting push button fingers 221, 226 and 228 at the end thereof for operating switches, as hereinafter described, and which fingers 221, 226 and 228 are shown in Figs. 11, 13 and 15.

Cross carriage

As shown in Figs. 5 and 7, a cross-slide generally indicated at 230 extends transversely over the bed 2 and is secured rigidly in fixed relation thereto on the ways 18' by clamps 232. By loosening the clamps 232, it is possible to adjust the position of the slide lengthwise of the bed. The cross-slide 230 has a guideway 234 on the upper face thereof (Fig. 5), slidably receiving therein a cross carriage 236 adapted to support working tools thereon. The cross carriage 236 is shown as provided with slots 238 and 240, in which the tools may be secured. As shown in Fig. 7, a tool post 242 is secured in the slot 238 and carries tool 244.

The cross carriage 236 is adapted to be operated hydraulically, for which purpose I have shown an eye-bolt 246 pivotally connected at 248 to one end of the carriage 236. The eye-bolt 246 has a swivel block 250 thereon pivotally connected at 251 to one end of the lever 252. The lever 252 is pivotally mounted at 254 on a bracket 256 extending laterally from one side of the bed 2. The opposite end of the lever 252 is pivotally connected at 258 with the outer end of a piston rod 260 connected with a piston within a cylinder of a hydraulic power device or ram 262 that extends under the bed 2 in the form shown. The hydraulic power device 262 is pivotally supported at 264 to the bed 2. If desired, however, this drive 262 could be connected directly with the cross carriage 236, although the position shown tends to conserve space and conveniently locates the power device beneath the bed.

The cross carriage is adapted to be controlled electrically by switches as hereinafter described, which switches are actuated by cams 266, 268 and 270 mounted on the side of the carriage 236 in adjusted positions relative to the carriage according to the work to be performed. Additional cams are shown at 272 and 274 at the under side of the carriage. Control levers 276 and 278 are pivotally mounted on opposite sides of the bed 2, and form stop blocks at the opposite limits of the carriage. The stop block or lever 276 is in position to be engaged by a contact finger 280, while the stop block or lever 278 is in position to be engaged by an adjustable stop finger 281, which may be positioned selectively along the side of the cross carriage 236. It is preferable to have the fingers 280 and 281 threadably engaging blocks 280' and 281', respectively, which blocks are secured in a T-slot in the side of the cross carriage.

Cross carriage hydraulic system

The hydraulic power device 262 which operates the cross carriage 236 in each opposite direction is controlled by the hydraulic system as shown generally in Fig. 27, which operates generally like the hydraulic system for the main carriage as described above in connection with Fig. 21.

The liquid is withdrawn from the tank 98 by a pump 282 through a filter 284, and is discharged from the pump 282 through a pipe 286. A pressure relief valve 288 is connected with the pipe 286 to return liquid to the tank 98 in the event of building up of excess pressure in the pipe.

The pipe 286 directs the liquid from the tank through the valve 290. The valve 290 is of the piston type and is controlled in its opposite directions by solenoids generally indicated at 292 and 294 moving the valve element to either extreme opposite position. The valve 290 is connected with the respective opposite ends of the cylinder of the hydraulic power device or ram 262 through pipes 296 and 298. The fluid will be forced into one end of the power device and will cause the piston to discharge said hydraulic fluid in the opposite end thereof out through the pipe leading therefrom and through the valve 290.

The discharge or return side of the valve 290 has a pipe 300 connected therewith and leading to a solenoid valve 302, which solenoid valve 302 is shown more in detail in Figs. 28 to 31. The valve 302, when in the position shown in Fig. 30, causes a relatively slow or feed movement of the cross carriage and when in position as shown in Fig. 29 causes a relatively fast movement which, on the cross carriage, serves as a rapid traverse. Because of the small amount of movement of the cross carriage, a really fast rapid traverse is not considered necessary because of the small amount of time required to move the cross carriage with even a moderate rate of traverse. It is to be pointed out that a two pump feed traverse fluid supply system similar to that used on the main carriage may be used if desired but, for normal lengths of strokes and rate of traverse it is not deemed necessary.

The valve 302 has a cylinder 304 therein (Fig. 28) within which is slidably mounted a piston type valve member 306, carrying discs 308 and 310. The valve disc 310 is notched at 312 to permit flow past the disc in the position illustrated in Fig. 30, partially covering the inlet port.

The valve member 306 is fixed on a valve stem 314 pivotally connected at 316 to a lever 318. The lever 318 is pivotally connected at one end at 320 with the body of the valve 302 while its opposite end is pivotally connected at 322 with the core 324 of a solenoid 326. A spring 328 is connected with the lever 318, tending to move the latter and the valve member 306 in a direction opposite to the movement thereof when attracted by the solenoid 326. The spring moves the valve 306 into position as shown in Fig. 28 and the solenoid moves the valve into the position as shown in Fig. 29.

Figure 30:
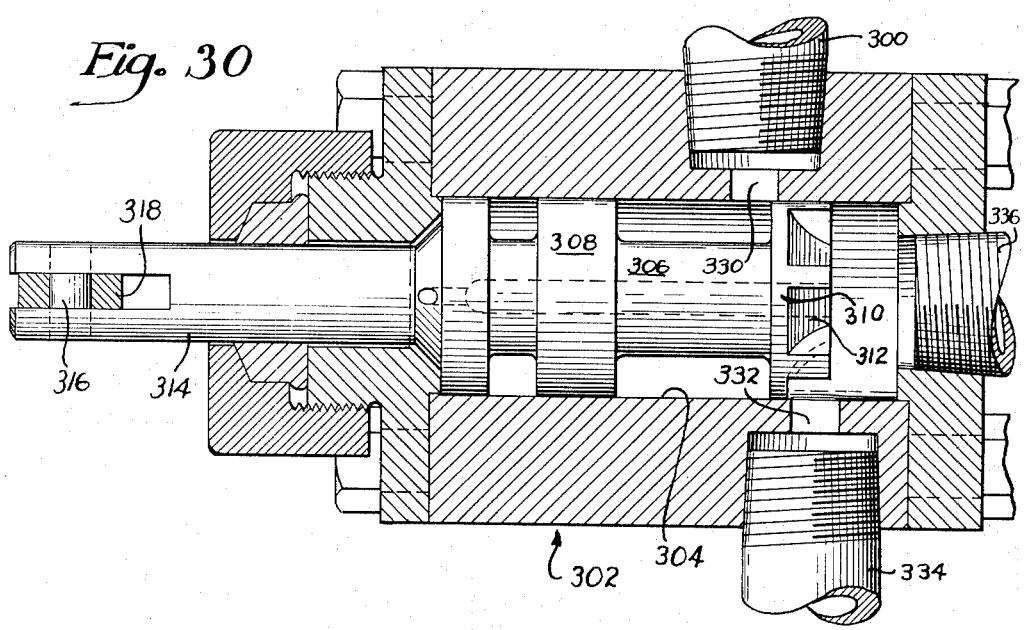
Fig. 30 is a horizontal section therethrough on the line 30—30 of Fig. 28, with the valve in the opposite position.
Figure 31:
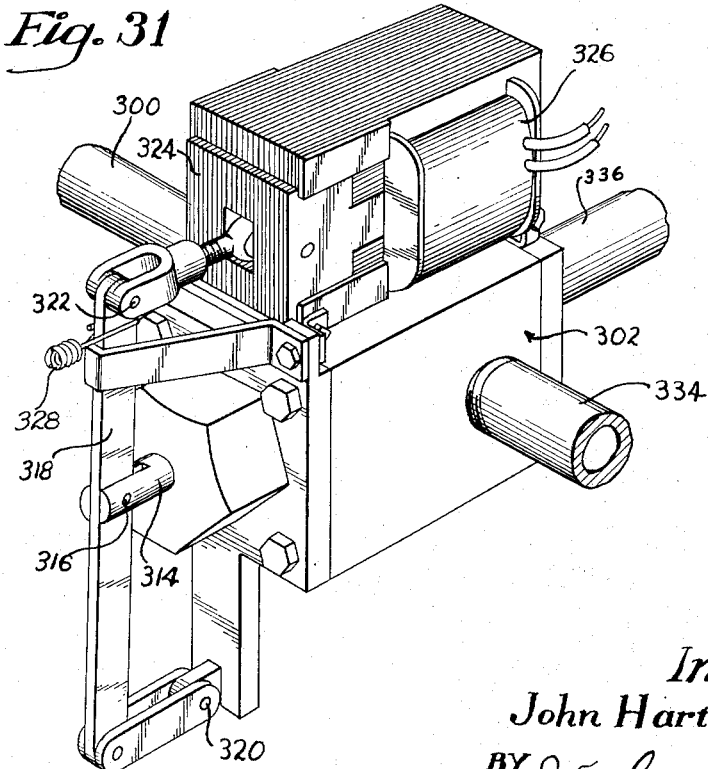
Fig. 31 is a perspective view of said valve.

The cylinder 304 of the valve 302 has an inlet port 330 in one side thereof and an outlet port 332 in the opposite side thereof, as shown in Fig. 30. The outlet port 332 is connected with a discharge pipe 334. The cylinder 304 is provided with a second outlet in the end thereof discharging to a branch outlet pipe 336 connected with the discharge pipe 334 and jointly therewith leading back to the tank 98 to return fluid thereto.

The fluid return pipe 300 has a discharge pipe 338 connected therewith intermediate the valves 290 and 302 for the purpose of by-passing fluid back to the tank 98 without its passing through valve 302. With the valve in this position, as shown in Fig. 30, the fluid will be by-passed through feed control valve generally indicated at 340, and also shown in Fig. 1, and thence through pipe 338 and back to the tank 98. The metering valve 340 is mounted on the forward side of the bed 2, as shown in Fig. 1, within convenient reach of the operator and may be set manually in the desired degree of opening to restrict the flow of fluid from the hydraulic device 262 to provide for slow or feed travel of the cross carriage and when the valve 302 is closed the fluid is by-passed around the valve 302 for movement of the ram in the hydraulic power device. The valve 340 remains in open set condition, subject to adjustment by the operator, in the form shown. However, this valve may be controlled automatically, if desired like the corresponding valve 174 of the main carriage hydraulic system above described (Fig. 21).

The cross carriage 236 is adapted to be operated by the hydraulic power device 262, either in feed stroke at relatively slow speed or in rapid traverse at appreciably higher speed. These movements are accomplished by the operation of the pump 282 which withdraws fluid from the tank 98 and directs it through the pipe 286 to the solenoid-controlled valve 290. According to which of the solenoids 292 or 294 is energized, this fluid from the pipe 286 will be directed either to the pipe 296 or to the pipe 298, and discharged from the other of these two, into and out of the hydraulic power device 262, causing movement of the ram therein in one direction or the other, and corresponding movement of the cross carriage 236.

The discharge of fluid from the cylinder of the power device will be directed from the valve 290 through the pipe 300. With the solenoid 326 of the valve 302 energized, the piston valve 306 will be moved into the position shown in Fig. 29, whereby the liquid will be discharged from the pipe 300 into the cylinder 304 at the port 330, and out through the open port 332 into pipe 334. This is the rapid traverse position of the valve 302. The valve 340, while partially open, allows only slow flow of fluid thereby and the fluid, following the path of least resistance, will pass out through the open valve 302, in the position shown in Fig. 29.

When the solenoid 326 is de-energized the valve member 306 will be moved by spring 328 to the position as shown in Figs. 28 and 30. In this position, the valve disc 310 will close off the port 332, compelling the returned fluid from the power device to be discharged through the pipe 338 and the open metering valve 340, back to the tank 98. Since this valve 340 is of restricted flow, only slow flow of the fluid is permitted in a feed stroke of the ram and cross carriage.

*Main carriage electrical control*

Figure 32:
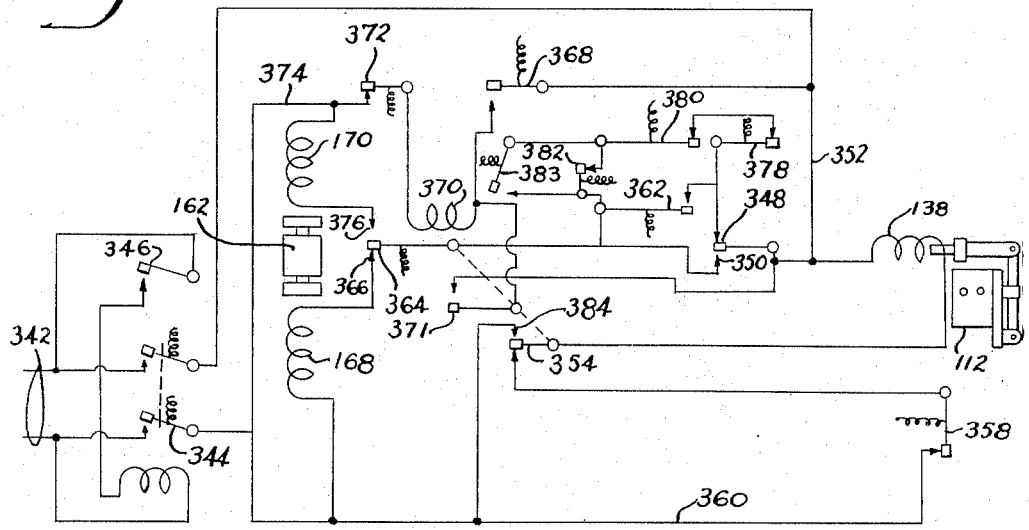
Fig. 32 is a diagrammatic view of the wiring circuit for the main carriage controls.

Referring to Fig. 32, the wiring diagram of the main carriage control is illustrated and shown as applied to the switches referred to above.

Any suitable source of electrical supply may be used as desired, the invention being shown as utilizing a source of electric current generally indicated at 342 connected with the control circuit by an electro-magnetic switch 344 which is closed upon closing of a toggle switch 346. The toggle switch 346 is a part of the main panel 14, as shown in Fig. 1.

The electrical control unit 14 also includes a switch 348 (Fig. 32), which may be turned either to the position shown in Fig. 32 or to a position in engagement with a contact 350, when the machine will make one stroke forward and then stop, as hereinafter described. For the automatic operation of the machine however, the switch 348 will be set in the automatic position shown in Fig. 32.

With the switch 344 closed and the automatic control switch 348 in the position shown in Fig. 32, current will flow through the line 352, the solenoid 138, the switch 354, the switch 356 and the line 360, to the other side of the input power circuit 342. This will open the valve 112 in the position shown in Fig. 25.

At the same time that the switch 346 is closed, the switch 362, also located in the control panel 14, is manually and momentarily closed, which will allow current to flow from the line 352, through the closed switch 348 in the position shown in Fig. 32, through the switch 362, to the movable contact 364, thence to the coil 168 and back to the other side of the power line 342. This will energize the solenoid 168, thereby opening the valve 162 (Fig. 21) to admit fluid into the end of the hydraulic power device 94 which will cause the carriage 20 to move forward in rapid traverse, since the valve 112 is also open, as described above.

When the carriage 20 has moved forward until the cam 218 on the barrel 194 engages the roller 192 of the lever 186 (Fig. 10), this causes the forward end of the lever to be depressed, thereby actuating the rack 180 and the pinion 178 to open the valve 174. This changes the rate of feed movement of the main carriage, in accordance with the setting of the cam 218.

As the carriage 20 moves forward a cam 218' engages a roller 193 on the forward end of lever 187 to depress said lever to actuate and open the switch 358 positioned thereunder (Figs. 9 and 32), thereby breaking the circuit through the solenoid coil 138 of the valve 112. This de-energizes the solenoid 138 and causes the valve member 118 to be moved by the spring 140 to the opposite position from that shown in Fig. 25 to the position as shown in Fig. 24. The returned fluid from the power device 94 will be discharged through the valve 174, now open, and the pipe 172 to the tank 98, which will allow only slow movement of the ram in a feed stroke. This will continue until the carriage reaches the end of its forward movement.

At the limit of the forward movement, the cam 220 on the barrel 196 (Fig. 11) engages a normally open switch 368, closing the latter, which thereby closes a circuit from the line 352, through the relay coil 370, thence through normally closed switch 372 and line 374, back to the other side of the power circuit 342.

The energizing of the coil 370 will attract the relay contact 364, moving the latter into engagement with a contact 376, and likewise changing the position of contact 354. This will close a circuit through the line 352, the movable contact 348, switches 378, 380 and 382, to the movable contact 364, fixed contact 376, and solenoid coil 170, to the line 374, thence to the other side of the power circuit.

Since the closing of the switch 368 is momentary, and the solenoid 170 should remain energized, a holding switch 371 will be closed also by the relay coil 370, shunting the circuit from the line 352 to the switch 371, coil 370, and switch 372 to the line 374 leading to the power line. This will maintain the solenoid 170 energized until this shunt circuit is broken.

The energizing of the coil 170 will shift the valve 162 to its opposite position, thereby causing movement of the ram in its opposite direction. This will cause a return of the carriage 20 toward its backward stroke. This return movement is in rapid traverse because the shifting of the movable contact 354, upon the energizing of the coil 370, causes this movable contact to engage a fixed contact 384, thereby closing a circuit from the line 352, through the coil 138 of the solenoid valve 112, contacts 354 and 384, to the line 360, thence to the other side of the power circuit.

This backward movement of the main carriage 20 will continue until the contact finger 226 (Fig. 11) engages the normally closed switch 372, and opens the latter, which thereby breaks the circuit through the coil 370 of the relay, causing the contact 364 thereof to be moved into engagement with the contact point 366. This will again energize the coil 168 and cause the carriage 20 to move forward toward the work. This will be in rapid traverse because the switch 358 is closed, inasmuch as the cam 218' (Fig. 9) has moved out of engagement with the contact roller 193, which previously caused an opening action of the switch 358.

This action will be repeated five times upon moving the carriage back and forth in the manner described until the successive stations of the turret 24 have been rotated step-by-step to present to the work the respective tools 26 carried thereby.

When the carriage returns in its backward stroke in the position of the number six station, the contact point 228 (Figs. 13 and 15) engage a switch 380, and thereby breaks the circuit to the coils 168 and 170 holding the ram in a fixed position. This stops the movement of the hydraulic power device 94 and of the main carriage, completing the cycle of operation of the latter.

The ram 94 may be stopped also by the opening of switch 378 which is mounted in the control panel 14, and may be opened by the operator at any time desired.

Fig. 32 shows also switches 382 and 383, in the control circuits for the solenoids 168 and 170, which switches are controlled by the cross carriage, as hereinafter described.

As above mentioned, if the automatic control arm 348 is moved into engagement with the contact 350, a circuit will be completed then from the line 352, through the contacts 348 and 350, the movable contact 364, fixed contact 366, and the coil 168, back to the other side of the power line. This will cause the main carriage to move forward through one stroke, but it will be stopped in that position and will not continue through the automatic cycle as described above, without resetting the machine.

*Cross carriage electrical control*

Figure 33:
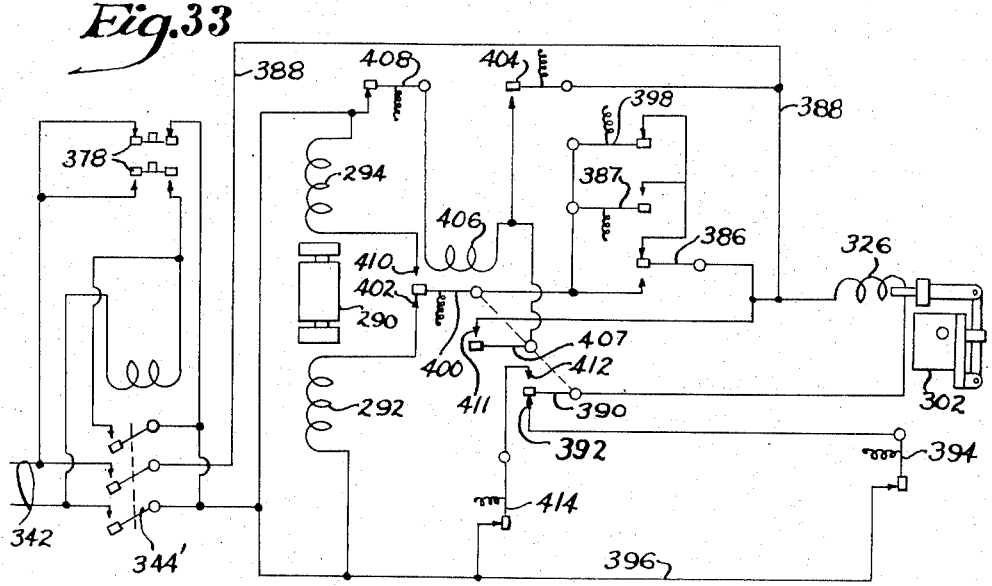
Fig. 33 is a similar view of the wiring circuit for the cross carriage.

The operation of the cross carriage electrical system is started when the power line switch 344', which is shown open in Fig. 33, is closed and the cross carriage switch 386 is set in automatic position as shown in Fig. 33.

The cross carriage operation cycle will be started when the main carriage 20 is returning in its backward movement. A cam 229' on the barrel 196 will engage and close the switch 387 (Fig. 13, 14, and 33) to start this cycle of movement of the cross carriage.

The initial closing of the power circuit at 344' has completed a circuit through the line 388, the coil of the solenoid 326, movable contact 390, now in engagement with fixed contact 392, switch 394, and line 396, back to the other side of the power circuit. This normally holds the solenoid energized, thereby locating the valve 302 in the position shown in Fig. 29.

When the switch 386 is closed in the position shown in Fig. 33 by the operator, and the switch 387 is closed by the backward movement of the main carriage, as described above, the switch 398 in parallel therewith now being open by the position of the cross carriage, a circuit will now be closed from the line 388, through the switch 386, switch 387, to the movable contact 400, now in engagement with contact 402, thence through the solenoid coil 292 to the opposite side of the power line.

This will open the valve 290, while the valve 302 is open, and admit fluid into the end of the hydraulic power device 262 in a direction to move the cross carriage in an "out" direction at rapid traverse. This rapid traverse of the cross carriage will continue until the switch 394 is engaged by the cam 266 on the cross carriage 236. As will be evident from Fig. 33, the opening of the switch 394 will de-energize the solenoid 326, which will cause the valve 302 to be shifted to the opposite position from that shown in Fig. 29, to the position as shown in Fig. 30. Such action will cause the liquid discharged from the hydraulic power device 262 to move through the valve 340, that will allow only slow movement of the ram of the power device, and thereby permit movement of the carriage 236 in slow feeding stroke.

When the carriage 236 reaches the limit of its "out" stroke, the contact finger 280 on the end thereof (Fig. 7) will engage the stop block 276, and close a switch 404 that is normally open. The closing of the switch 404 will complete a circuit from the line 388, through the switch 404, relay coil 406 that controls the movable contacts 399 and 400, thence through a normally closed switch 408, to the return side of the power line circuit.

The energizing of the relay coil 406 will attract the movable contact 400, moving it into engagement with contact 410. This will complete a circuit from the line 388, through the switch 386, switch 398, contacts 400, 410, through the solenoid coil 294, to the opposite side of the power line circuit.

The movement of the contact 400 will act also to close a holding switch 407 which engages contact 411 to maintain the coil 406 energized after the switch 404 opens. This holding circuit will be from the line 388, switch 407, coil 406, and switch 408 to the power line.

At the same time, the energizing of the coil 406, shifting the movable contact 399 into engagement with fixed contact 412, will close a circuit from the solenoid coil 326 of the valve 302, through the movable contact 399, fixed contact 412, through a switch 414 to the line 396, thence to the opposite side of the power line circuit. This will act not only to return the cross carriage at the end of its "out" feed stroke, but the movement thereof will be in rapid transverse because of the opening of the valve 302.

The relay coil 406, when energized, also closes a holding switch 407, which acts like the switch 371, to hold the circuit closed through the relay coil after the breaking of the initial energizing circuit at the switch 404.

This movement of the cross carriage in "in" movement, at rapid traverse, is changed to feed of the cross carriage when the switch 414 is engaged and opened by the cam 270, thereby breaking the circuit through the solenoid 326, de-energizing the solenoid, which will cause the valve 302 to be moved by spring 328 into the position as shown in Fig. 28. This will close off the flow of fluid through line 300 and will direct the flow of the fluid through metering valve 340 which will give a feed travel to the cross carriage (Fig. 7). This feed stroke will continue until the switch 408 is engaged and opened by the stop block 278 actuated by engagement with the cross carriage 236 moving in "in" feed stroke. The opening of the switch 408 de-energizes the relay coil 406, changing the movable contacts 390 and 400 into engagement with the fixed contacts 392 and 402, respectively, thereby changing the feed to opposite rapid traverse, as described above.

This motion will be stopped when the switch 398 is engaged and opened by the cam 272 on the cross carriage 236. The opening of the switch 398 breaks the circuit from the line 398 to both of the coils 292 and 294, and shunts off the return movement at the end of the cycle.

As shown in Fig. 7, a switch 383 is in position to be engaged by a finger 274 on the cross carriage 236, which switch 383 is connected in parallel with the switch 382, and is normally open while the latter is normally closed. When these switches are in the position shown in Fig. 32, both the longitudinal and cross feed carriages will operate in the manner described. However, when the finger 221 on the main carriage 20 engage and opens the switch 382 (Fig. 16), the main carriage will remain stationary until the cross carriage engages and closes the switch 383, which will thereby reset the main carriage circuit for another operation.

The switches 368 and 387 are separately and respectively mounted on the bed 2, and while shown in side-by-side relation, either or both of these may be adjusted lengthwise. Such adjustment is shown in Figs. 11, 13 and 14 as provided by rows of holes 369 and mounting bolts 371 selectively engaged in the holes.

It will be evident that the stop switches may be positioned at any desired points on the machine and adjustments made to move the carriage as desired. For instance, the switch 372, or the screw contact finger 226 (Fig. 11) may be so adjusted as to return the carriage toward the work without the necessity of moving throughout the length of the bed.

It is possible, by the use of switches and control cams and fingers, to obtain a wide variation of adjustment and actions of the machine, as (a) changing the direction of movement of the carriage; (b) changing the rate of movement, i. e., from rapid traverse to feed; (c) changing the end of travel of the ram; and (d) changing the point at which the cross carriage starts its travel. These and other improved features of this machine, as will be evident from the foregoing description, make it a material improvement in this art.

While the invention has been illustrated and described in one embodiment, it is recognized that variations and changes may be made therein, without departing from the invention, except as specified in the claims.

I claim:

1. In a machine tool having a bed, a carriage reciprocably mounted on said bed, means to reciprocate said carriage, a turret on said carriage, a pivot bolt passing axially through said turret to rotatably support said turret on said carriage, means to rotate said turret, a clamp member on one end of said bolt, a lever pivoted at one end to said carriage, a spring between said carriage and the other end of said lever said other end of said bolt being pivotally attached between the two ends of said lever, said spring acting to press the lever away from said turret to draw the clamp and the bolt against the turret to thereby clamp the turret to the carriage, a wedge shaped cam on said bed, a roller mounted on said lever between the spring and bolt connection, said roller adapted to engage said cam when said carriage is reciprocated to thereby raise said lever to unclamp said turret.

2. The device of claim 1 wherein the means for rotating the turret comprises, abutments projecting from the turret corresponding in number to the work stations of said turret, an elongated stop pivotally mounted at one end, and above said bed on a vertical pivot axis, the other end of said stop being in the path of travel of an abutment on said turret, whereby said turret is rotated when said abutment engages said stop.

JOHN HART WILSON.

References Cited in the file of this patent

UNITED STATES PATENTS

| Number | Name | Date |
|---|---|---|
| 623,322 | Lavigne | Apr. 18, 1899 |
| 1,244,664 | Warren | Oct. 30, 1917 |
| 1,288,351 | Wood | Dec. 17, 1918 |
| 1,909,165 | Burrell | May 16, 1933 |
| 1,934,358 | Kylin | Nov. 7, 1933 |
| 2,047,181 | Ferris | July 14, 1936 |
| 2,118,021 | Curtis | May 17, 1938 |
| 2,118,025 | Curtis | May 17, 1938 |
| 2,148,348 | Groene et al. | Feb. 21, 1939 |
| 2,289,957 | Godfriaux | July 14, 1942 |
| 2,392,074 | Wasson | Jan. 1, 1946 |